United States Patent
Misra et al.

(10) Patent No.: US 9,454,602 B2
(45) Date of Patent: Sep. 27, 2016

(54) GROUPING SEMANTICALLY RELATED NATURAL LANGUAGE SPECIFICATIONS OF SYSTEM REQUIREMENTS INTO CLUSTERS

(71) Applicant: Accenture Global Services Limited, Dublin (IE)

(72) Inventors: Janardan Misra, Bangalore (IN); Shubhashis Sengupta, Bangalore (IN); Subhabrata Das, Kolkata (IN)

(73) Assignee: Accenture Global Services Limited, Dublin (IE)

( * ) Notice: Subject to any disclaimer, the term of this patent is extended or adjusted under 35 U.S.C. 154(b) by 212 days.

(21) Appl. No.: 14/013,717

(22) Filed: Aug. 29, 2013

(65) Prior Publication Data

US 2015/0066939 A1 Mar. 5, 2015

(51) Int. Cl.
*G06F 17/30* (2006.01)

(52) U.S. Cl.
CPC ................... *G06F 17/3071* (2013.01)

(58) Field of Classification Search
None
See application file for complete search history.

(56) References Cited

U.S. PATENT DOCUMENTS

| | | | | |
|---|---|---|---|---|
| 6,778,995 | B1 * | 8/2004 | Gallivan | 707/739 |
| 8,166,051 | B1 * | 4/2012 | Bauer et al. | 707/750 |
| 8,180,760 | B1 * | 5/2012 | Carver et al. | 707/708 |
| 8,762,326 | B1 * | 6/2014 | Zhou et al. | 707/609 |
| 2003/0028367 | A1 * | 2/2003 | Chalabi | 704/4 |
| 2007/0277121 | A1 * | 11/2007 | Beckman | 715/847 |
| 2012/0290988 | A1 * | 11/2012 | Sun et al. | 715/853 |

OTHER PUBLICATIONS

Ferrari et al., "A clustering-based approach for discovering flaws in requirements specifications", In Proceedings of the 27th Annual ACM Symposium on Applied Computing, 2012, pp. 1043-1050.
Duan, "Clustering and its application in requirements engineering." Technical Report, 2008, 27 pages.
Felfernig et al., "Recommendation and decision technologies for requirements engineering", In Proceedings of the 2nd International Workshop on Recommendation Systems for Software Engineering, ACM, 2010, 5 pages.
Cleland-Huang et al., "Using data mining and recommender systems to scale up the requirements process", In Proceedings of the 2nd international workshop on Ultra-large-scale software-intensive systems, ACM, May 10-11, 2008, 4 pages.

(Continued)

*Primary Examiner* — Son T Hoang
(74) *Attorney, Agent, or Firm* — Harrity & Harrity, LLP

(57) ABSTRACT

A device may analyze text to identify a set of text portions of interest, and may analyze the text to identify a set of terms included in the set of text portions. The device may perform a similarity analysis to determine a similarity score. The similarity score may be determined between each term, included in the set of terms, and each text portion, included in the set of text portions, or the similarity score may be determined between each term and each other term included in the set of terms. The device may determine a set of dominant terms based on performing the similarity analysis. The set of dominant terms may include at least one term with a higher average degree of similarity than at least one other term. The device may provide information that identifies the set of dominant terms.

20 Claims, 21 Drawing Sheets

(56) References Cited

OTHER PUBLICATIONS

Duan et al., "A Clustering Technique for Early Detection of Dominant and Recessive Cross-Cutting Concerns", In Proceedings of the Early Aspects at ICSE: Workshops in Aspect-Oriented Requirements Engineering and Architecture Design, IEEE Computer Society, 2007, 7 pages.

Kit et al., "Isolating and relating concerns in requirements using latent semantic analysis", In Proceedings of the 21st annual ACM SIGPLAN conference on Object-oriented programming systems, languages, and applications, vol. 41, Oct. 22-26, 2006, pp. 383-396.

Baniassad et al., "Finding aspects in requirements with Theme/Doc", Early Aspects: Aspect-Oriented Requirements Engineering and Architecture Design, 2004, 8 pages.

Cleland-Huang et al., "Utilizing supporting evidence to improve dynamic requirements traceability", Requirements Engineering, 2005, Proceedings, 13th IEEE International Conference on. IEEE, 2005, 10 pages.

Laurent et al., "Towards automated requirements triage", 15$^{th}$ IEEE International Requirements Engineering Conference, 2007, pp. 131-140.

\* cited by examiner

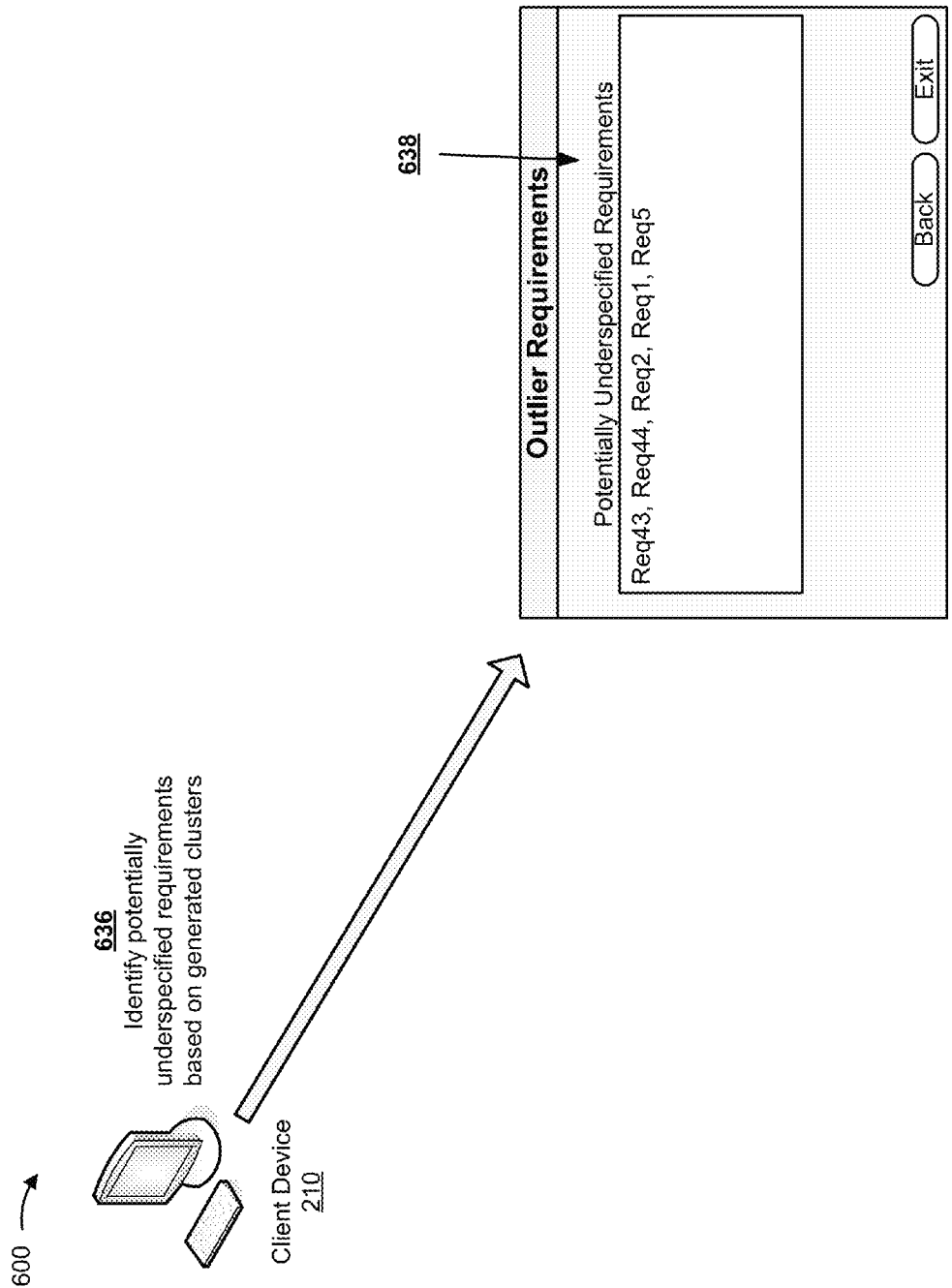

Requirement Clustering Around Theme Sets – Level 1

| Theme Set ID | Themes | Requirement Clusters around Theme Set |
|---|---|---|
| Theme Set5 | Brownfields Property, Information, Access | [Req31] |
| Theme Set1 | Home Page, Property, Website | [Req29, Req11] |
| Theme Set2 | Property, Home Page | [Req13, Req11, Req16, Req19, Req21, Req32] |
| Theme Set3 | Site, Record, Table, User, Function | [Req23, Req11] |
| Theme Set4 | Update, Remove, Incentive, Change, Maintain, Purchase, Add, Validate, Sell, Buyer, Capture, Characterize, Web Site, Receive, Control, Approve, ... | [Req11, Req12, Req17, Req20, Req34, Req35, Req36, Req5, Req6, Req7, Req30, Req9, Req27, Req25, Req26] |
| Theme Set6 | Database | [Req24, Req2, Req4, Req37, Req38, Req31, Req39, Req40, Req41] |
| Theme Set7 | Advantage | [Req8, Req10, Req14, Req18, Req28, Req33, Req44, Req1, Req3, Req15, Req22] |

FIG. 8D

Requirement Clustering Around Theme Sets – Level 2

835

| Theme Set ID | Themes | Requirement Clusters around Theme Set |
|---|---|---|
| Theme Set5 | Brownfields Property, Information, Access | [Req31] |
| Theme Set1 | Home Page, Property, Website | [Req29] *** [Req11] |
| Theme Set2 | Property, Home Page | [Req13, Req11] *** [Req16, Req19, Req21, Req32] |
| Theme Set3 | Site, Record, Table, User, Function | [Req23] *** [Req11] |
| Theme Set4 | Update, Remove, Incentive, Change, Maintain, Purchase, Add, Validate, Sell, Buyer, Capture, Characterize, Web Site, Receive, Control, Approve, ... | [Req11, Req12, Req17, Req20, Req34, Req35, Req36] *** [Req5, Req6, Req7, Req30, Req9, Req27, Req39, Req40, Req41] |
| Theme Set6 | Database | [Req24] *** [Req2, Req4, Req37, Req18, Req28, Req33, Req44] *** [Req1, Req3, Req15, Req22] |
| Theme Set7 | Advantage | [Req8, Req10, Req14, Req18, Req28, Req33, Req44] *** [Req1, Req3, Req15, Req22] |

Previous Level   Next Level

Back

Proceed to Weighted Connected Component Based Clustering

FIG. 8E

GROUPING SEMANTICALLY RELATED NATURAL LANGUAGE SPECIFICATIONS OF SYSTEM REQUIREMENTS INTO CLUSTERS

BACKGROUND

Text documents may be processed to extract specifications of system requirements and distribute the system requirements into groups. Analysis of the grouping of the requirements may be used for facilitating system design and development.

SUMMARY

According to some possible implementations, a device may include one or more processors to: receive information that identifies a document to be analyzed; analyze the document to identify a set of requirements to be analyzed; analyze the document to identify a set of themes to be analyzed; perform a similarity analysis to determine a similarity score between at least one of: each theme, included in the set of themes, and each requirement, included in the set of requirements, or each theme, included in the set of themes, and each other theme, included in the set of themes; determine a set of dominant themes based on performing the similarity analysis, where the set of dominant themes including at least one theme, included in the set of themes, with a higher similarity score than at least one other theme included in the set of themes; and provide information that identifies the set of dominant themes.

According to some possible implementations, a method may include: analyzing, by a device, text to identify a set of text portions of interest; analyzing, by the device, the text to identify a set of terms included in the set of text portions; performing, by the device, a similarity analysis to determine an average degree of similarity between at least one of: each term, included in the set of terms, and each text portion, included in the set of text portions, or each term, included in the set of terms, and each other term, included in the set of terms; determining, by the device, a set of dominant terms based on performing the similarity analysis, where the set of dominant terms including at least one term, included in the set of terms, with a higher average degree of similarity than at least one other term included in the set of terms; and providing, by the device, information that identifies the set of dominant terms According to some possible implementations, a computer-readable medium may store one or more instructions that, when executed by one or more processors, cause the one or more processors to: identify a set of requirements in a document to be analyzed; identify a set of terms in the document to be analyzed; perform a similarity analysis to determine a similarity measurement between at least one of: each term, included in the set of terms, and each requirement, included in the set of requirements, or each term, included in the set of terms, and each other term, included in the set of terms; determine a set of dominant terms based on performing the similarity analysis, where the set of dominant terms including at least one term, included in the set of terms, with a higher similarity measurement than at least one other term included in the set of terms; and provide information that identifies the set of dominant terms.

BRIEF DESCRIPTION OF THE DRAWINGS

FIGS. 6A-6F are diagrams of an example implementation relating to the example processes shown in FIG. 4 and FIG. 5;

FIGS. 8A-8I are diagrams of an example implementation relating to the example processes shown in FIG. 4 and FIG. 7.

DETAILED DESCRIPTION

The following detailed description of example implementations refers to the accompanying drawings. The same reference numbers in different drawings may identify the same or similar elements.

A natural language text (e.g., a requirements document) may include one or more sentences of text, such as plain text, annotated text (e.g., text with terms, tags associated with the terms, etc.), or the like. The sentences may describe one or more requirements for use in system design and development. A requirement may include an explanation of a desired property of a system. A user of the text may determine properties associated with the requirements based on an analysis of the document, such as determining common words, requirements that reference other requirements, or the like. Analysis of a text that includes requirements may include grouping the requirements based on one or more properties, such as a similarity property, a size property, or the like. Grouping may be performed by manual grouping. However, manual grouping may be dependent on user knowledge of the requirements and may involve excessive manual work. Implementations described herein may utilize natural language processing to determine central concepts associated with the requirements document and thereby group requirements into coherent clusters. Furthermore, implementations described herein may facilitate analysis of the requirements by providing information associated with the requirements.

Figure 1:
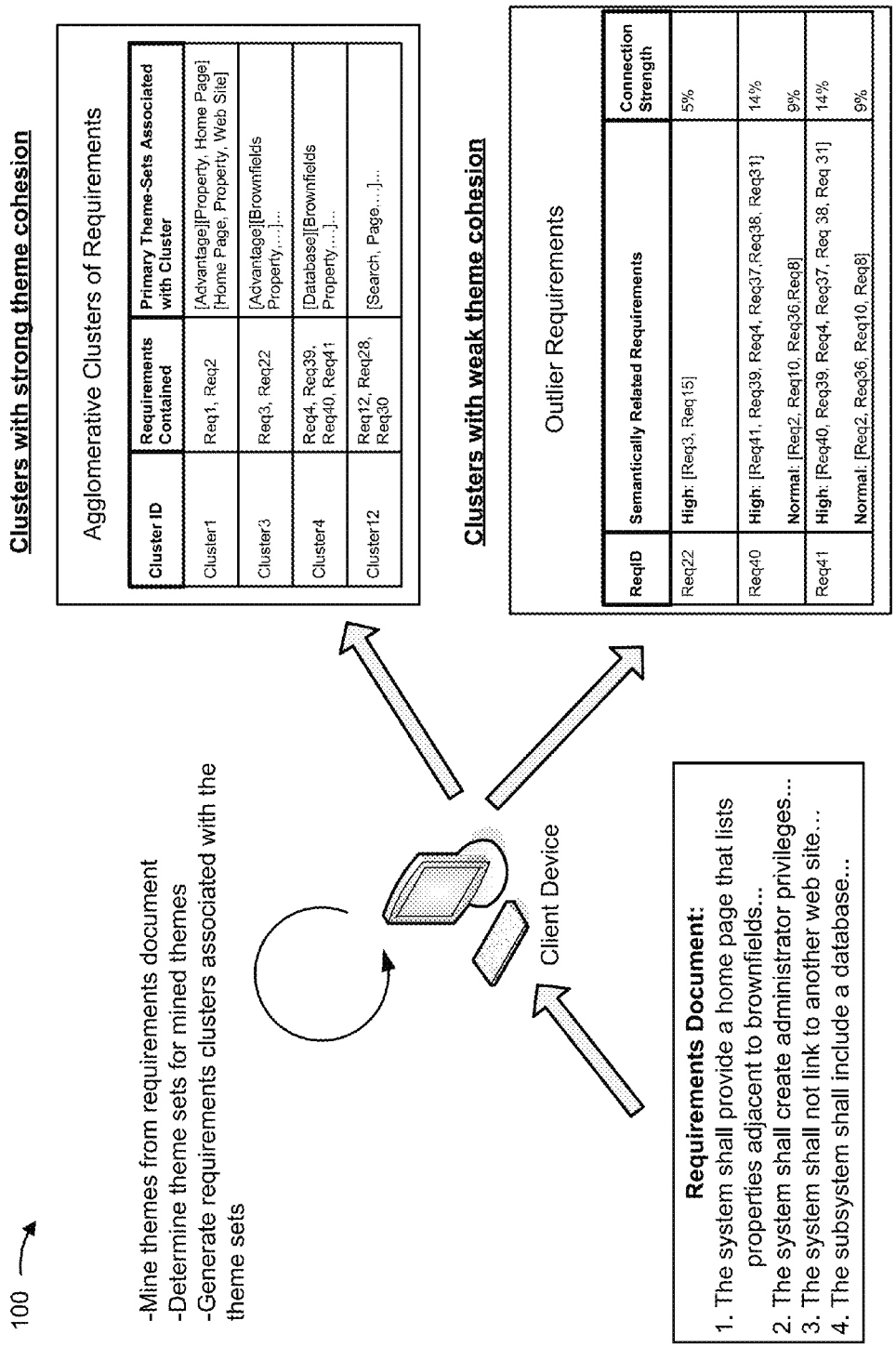
FIG. 1 is a diagram of an overview of an example implementation described herein.

FIG. 1 is a diagram of an overview of an example implementation 100 described herein. As shown in FIG. 1, implementation 100 may include a client device, such as a desktop computer, that may receive a requirements document (e.g., a natural language text document) for analysis. The client device may process the requirements document to mine themes, such as by identifying semantic information in the document, performing similarity analysis techniques on the semantic information, or the like. The similarity analysis techniques, described elsewhere herein, may be used to determine relatedness between determined semantic entities, such as terms, requirements, headings, or the like. The requirements document may include a quantity of natural language requirements, ordered using a numbering system. The client device may process the requirements document to identify the requirements included in the requirements document, and may label the requirements (e.g., "Req1," "Req2," "Req3," etc.). The client device may mine themes (e.g., "Property," "Home Page," "Brownfields," etc.) from the requirements document based on one or more metrics, such as a term frequency metric, a term placement metric, or the like.

As further shown in FIG. 1, the client device may cluster the mined themes into theme sets. A theme may refer to a concept to which terms in a text are related, and may include one or more terms. A theme set may refer to a grouping of themes for which each theme grouped therein is determined to be more similar to the other themes grouped therein than to themes not grouped within the theme set. The client device may determine similarity based on one or more similarity analysis techniques, described elsewhere herein, such as a semantic similarity, a cosine similarity, a centroid similarity, or the like.

As further shown in FIG. 1, the client device may generate requirements clusters associated with the theme sets. The client device may perform clustering based on one or more similarity analysis techniques, such as a semantic similarity, a placement similarity, a clustering similarity, a combined similarity, or the like. The client device may perform clustering using one or more cluster techniques, such as a hierarchical agglomerative clustering technique, a requirement clustering around theme sets technique, a weighted connected component based requirement clustering technique, or the like. The client device may provide information identifying the requirements clusters and theme sets associated with the requirement clusters.

As further shown in FIG. 1, the client device may provide information based on mining themes, determining theme sets, and/or generating requirements clusters, such as information identifying outlier requirements, potentially underspecified requirements, or the like. In this way, the client device may perform theme mining to group requirements into coherent clusters, and may provide information associated with the requirements, thereby facilitating requirements analysis on a requirements document.

Figure 2:
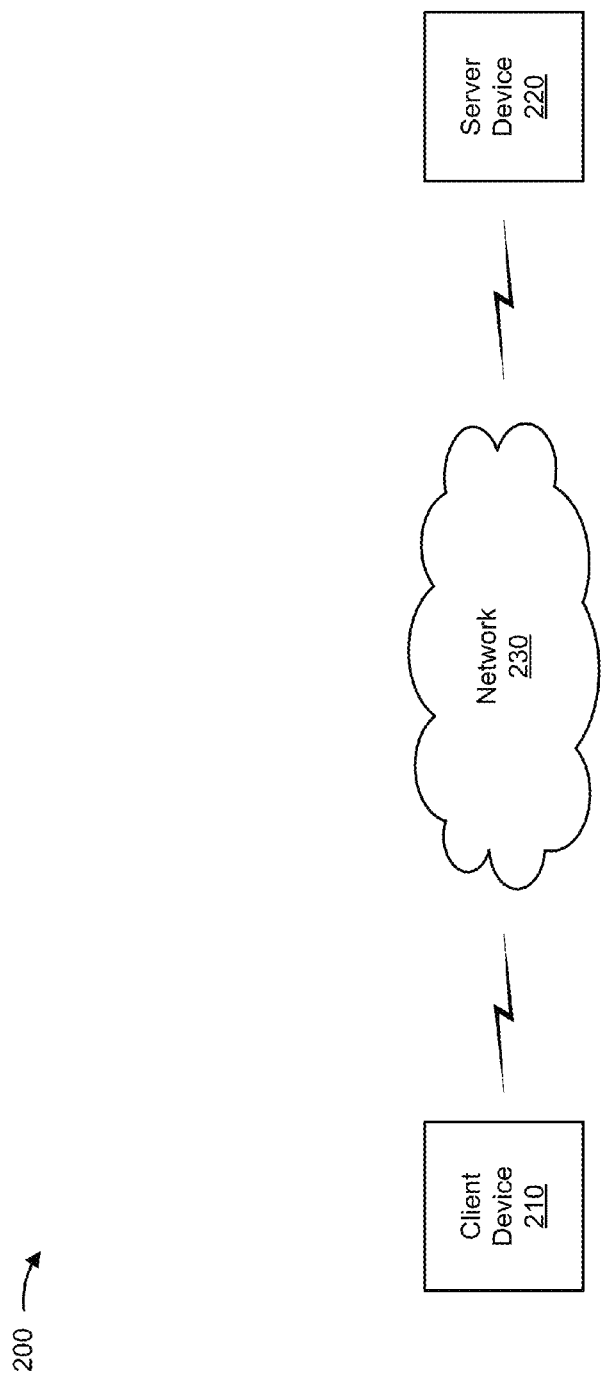
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include client device 210, server device 220, and a network 230. Devices of environment 200 may interconnect via wired connections, wireless connections, or a combination of wired and wireless connections.

Client device 210 may include one or more devices capable of receiving, generating, storing, processing, and/or providing a requirements document (e.g., a document including requirements) and/or information associated with the requirements document to facilitate analysis of the interrelatedness of the requirements. For example, client device 210 may include a computing device, such as a desktop computer, a laptop computer, a tablet computer, a handheld computer, a server, a mobile phone (e.g., a smart phone, a radiotelephone, etc.), or a similar device. In some implementations, client device 210 may receive information from and/or transmit information to server device 220 (e.g., a requirements document and/or information associated with the requirements document).

Server device 220 may include one or more devices capable of receiving, generating, storing, processing, and/or providing a requirements document and/or information associated with a requirements document. For example, server device 220 may include a computing device, such as a server, a desktop computer, a laptop computer, a tablet computer, a handheld computer, or a similar device.

Network 230 may include one or more wired and/or wireless networks. For example, network 230 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
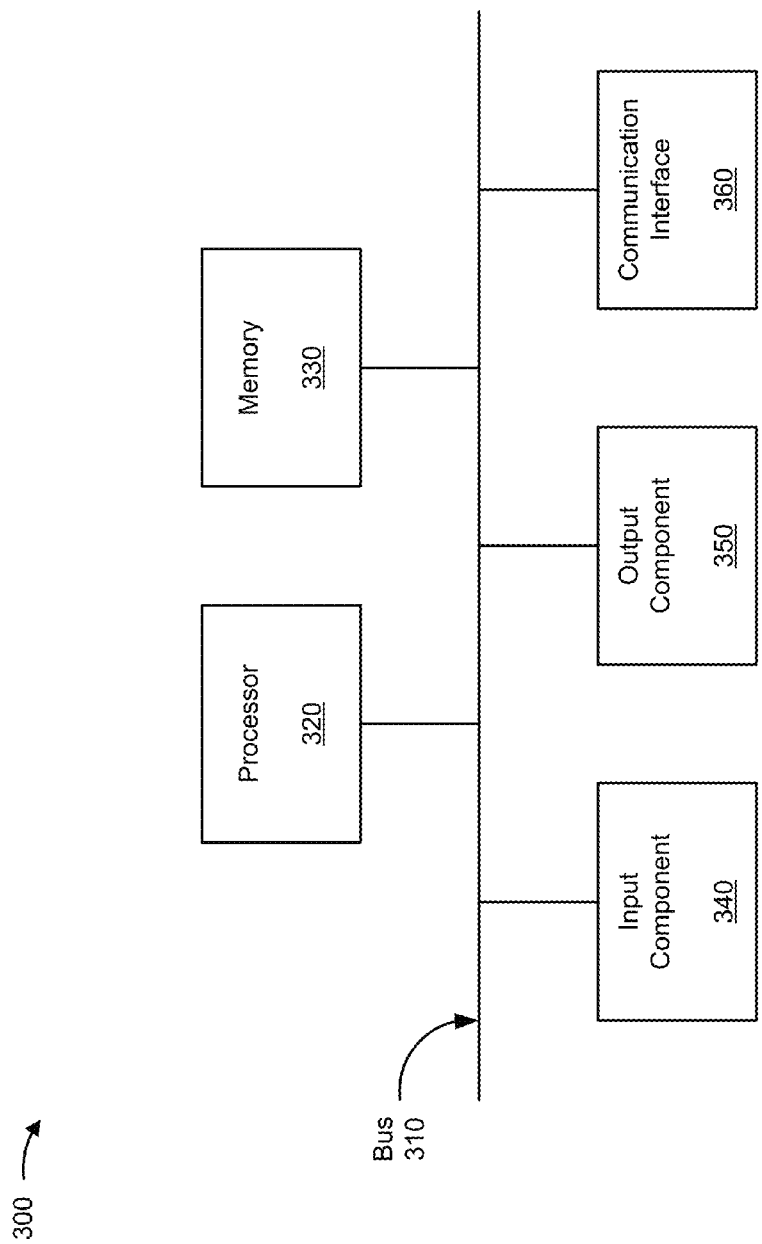
FIG. 3 is a diagram of example components of one or more devices of FIG. 2.

FIG. 3 is a diagram of example components of a device 300. Device 300 may correspond to client device 210 and/or server device 220. In some implementations, client device 210 and/or server device 220 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
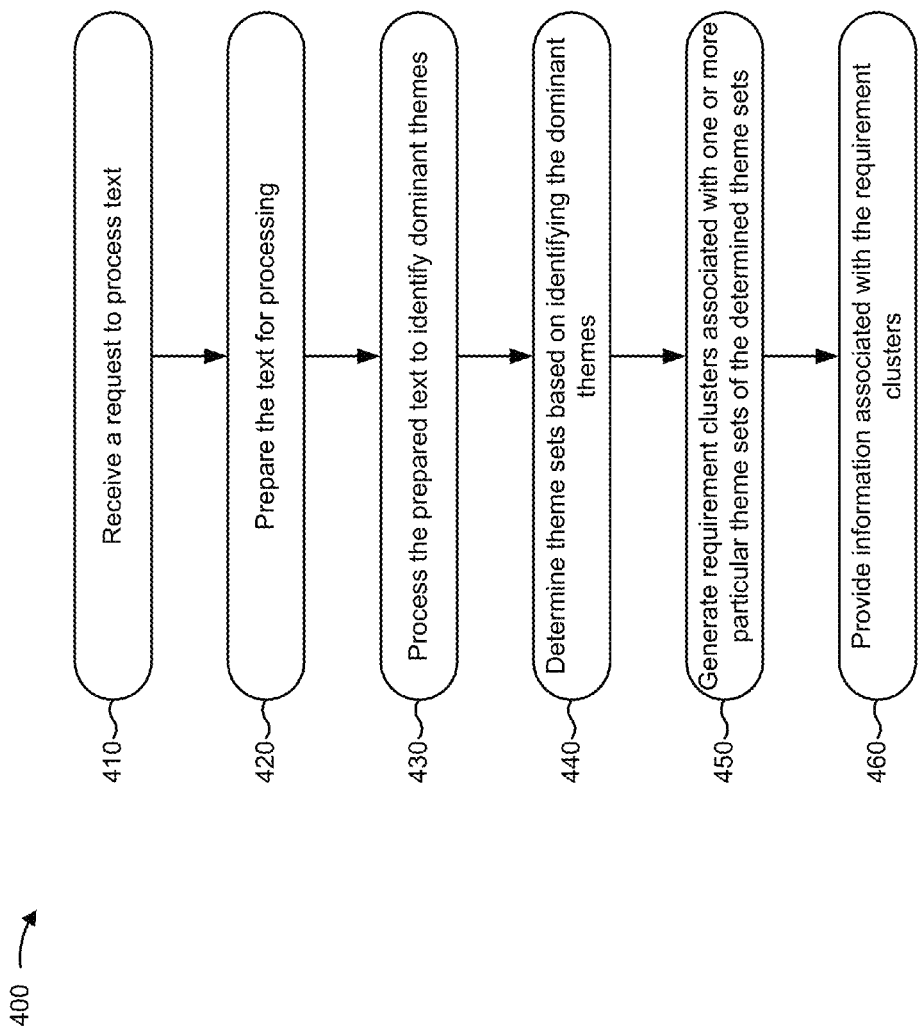
FIG. 4 is a flow chart of an example process for processing a natural language specification of system requirements to generate clusters.

FIG. 4 is a flow chart of an example process 400 for processing a natural language specification of system requirements to generate coherent clusters. In some implementations, one or more process blocks of FIG. 4 may be performed by client device 210. In some implementations, one or more process blocks of FIG. 4 may be performed by another device or a group of devices separate from or including client device 210, such as server device 220.

As shown in FIG. 4, process 400 may include receiving a request to process text (block 410). For example, client device 210 may receive the request from a user of client device 210. In some implementations, client device 210 may receive the request via user interaction with a user interface of client device 210. Additionally, or alternatively, client device 210 may receive the request from server 220 (e.g., via network 230).

The request may identify text to be processed by client device 210, in some implementations. The text may include, for example, a document that includes text (e.g., a text file, a file that includes text and other information, such as images, etc.), a group of documents that include text (e.g., multiple files), a portion of a document that includes text (e.g., a portion indicated by a user, a portion identified by document metadata, etc.), and/or any information that includes text. In some implementations, the request may specify one or more sections of a document to be processed. Additionally, or alternatively, the request may specify a manner in which the sections are to be partitioned for processing. For example, the sections may be sentences, and the request may specify that the sentences be partitioned based on capital letters and/or periods (.). Similarly, the request may identify one or more sections of the text as headings, in some implementations. For example, one or more sections of the text may provide organization information related to one or more other sections of the text.

The request may identify one or more terms, included in the text, to be processed by client device 210 to determine whether the one or more terms are alias terms of other terms in the text, in some implementations. A term, as used herein, may refer to a particular combination of characters, such as a word, multiple words (e.g., a phrase, a sentence, etc.), a character, multiple characters (e.g., a character string), or the like.

As described in more detail elsewhere herein, the request may identify other information to be used by client device 210 when processing the text to determine alias terms, such as a list of tags to be used when processing the text, a list of themes associated with the text, a data structure storing alias terms (e.g., synonyms of terms in the text), one or more configuration parameters (e.g., clustering parameters, similarity analysis parameters, etc.), or the like.

As further shown in FIG. 4, process 400 may include preparing the text for processing (block 420). For example, client device 210 may receive the request to process the text, and may perform preparatory processing to facilitate theme mining, theme set determination, requirement cluster generation, etc. As described in more detail in connection with FIG. 5, preparing the text for processing may include standardizing the text (e.g., removing a particular type of formatting, adjusting a particular spacing, etc.), labeling requirements, parsing sentences of the text to determine part of speech tags for words of the text, generating a term corpus (e.g., a set of terms included in the text, such as entity terms, action terms, or the like), generating a co-occurrence data structure, combining alias terms included in the co-occurrence data structure, applying information theoretic weighting to the co-occurrence data structure, or the like. In some implementations, preparing the text for processing may include providing a term list for processing.

As further shown in FIG. 4, process 400 may include processing the prepared text to identify dominant themes (block 430). For example, client device 210 may process the prepared text to determine dominant themes in the prepared text. A dominant theme may refer to a term that is closely related to requirements, other terms, headings, etc., in the prepared text.

Client device 210 may determine dominant themes by performing a similarity analysis technique on the term list, by selecting top terms (e.g., terms that are most similar as compared to other terms) based on the similarity analysis, and by selecting between top entity themes and/or top action themes, in some implementations. For example, client device 210 may perform a cosine similarity analysis to determine dominant themes. Cosine similarity analysis may refer to calculating a cosine similarity score between two vectors based on a cosine distance. Client device 210 may calculate the cosine distance for two vectors X and X' where each vector contains n items. The cosine distance may be calculated as the angular distance between vectors X and X', and may be calculated as follows:

$$\text{Cosine}(X, X', n) = \frac{\sum_{l=1}^{l=n} X[l]X'[l]}{\sqrt{\sum_{l=1}^{l=n} X[l]^2} \sqrt{\sum_{l=1}^{l=n} X'[l]^2}}$$

where X[l] is the l-th value in the vector X and X'[l] is the l-th value in the vector X'. The cosine distance may be represented herein as Cosine(X, X', n).

Client device 210 may calculate the cosine distance $\theta_u$ for each term u in the list of terms TermList (e.g., where TermList[j]=u). When latent semantic indexing is to be performed, the cosine similarity may be calculated based on the average cosine distance of term u with all requirements and/or the average cosine distance of term u with all terms. The average cosine distance of term u with all requirements may be calculated as follows:

$$\mu_u = \frac{\sum_{i=1}^{i=d} \text{Cosine}(U[j], V[i], k)}{d}$$

where $\mu_u$ represents the average cosine distance for term u with all requirements in the list of requirements D, Cosine (U[j], V[i], k) represents the cosine distance between the j-th value of truncated matrix U and the i-th value of the truncated matrix V, d represents the quantity of requirements in requirements list D, k represents the size value for U, U represents the truncated matrix U, and V represents the truncated matrix V.

Similarly, client device 210 may determine the average cosine distance of term u with all terms. For example:

$$\gamma_u = \frac{\sum_{i=1}^{i=t} \text{Cosine}(U[j], U[i], k)}{t}$$

where $\gamma_u$ represents the average cosine distance for term u with all terms in the list of terms TermList, Cosine(U[j], U[i], k) represents the cosine distance between the j-th value of truncated matrix U and the i-th value of the truncated matrix U, d represents the quantity of requirements in requirements list D, k represents a size value for U, and U represents the truncated matrix U.

Client device 210 may determine the cosine similarity based on calculating an average of the average cosine distance of term u with all requirements and the average cosine distance of term u with all terms. For example:

$$\theta_u = \frac{\mu_u + \gamma_u}{2}$$

where $\theta_u$ represents the cosine similarity of term u, $\mu_u$ represents the average cosine distance of term u with all requirements, and $\gamma_u$ represents the average cosine distance of term u with all terms.

Additionally, or alternatively, when latent semantic indexing is not to be performed, cosine similarity may be determined based on the average cosine distance of term u with all the requirements and/or terms of matrix C (e.g., a co-occurrence matrix C, as described elsewhere herein). For example, client device 210 may initialize a value $\mu_u$ to zero, where $\mu_u$ represents the average cosine distance of term u with all requirements. For each requirement $\text{Req}_i$ in the list of requirements D, client device 210 may calculate the value of $\mu_u$. For each term t included in requirement $\text{Req}_i$ (e.g., for each term included in a sentence, where a requirement is a sentence in a requirements document), client device 210 may initialize a value of $s_i$ to zero, where $s_i$ represents a cosine distance between a term t, included in the requirement, and a requirement. For example, for requirement $\text{Req}_i$, client device 210 may calculate $s_i$ as follows:

$s_i = s_i + \text{Cosine}(C[j], C[k], d)$.

In the above expression, Cosine(C[j], C[k], d) may represent the cosine distance between the j-th value of co-occurrence matrix C and the k-th value of co-occurrence matrix C, d may represent the quantity of requirements in the list of requirements D, and k may represent an index of term t in the list of terms TermList (e.g., TermList[k]=t).

Once client device 210 has calculated a final value of $s_i$ for term t (e.g., a value that represents a sum of the cosine distances between term t and all requirements/terms), client device 210 may calculate a value of $\mu_u$ for the term t as follows:

$$\mu_u = \mu_u + \frac{s_i}{n}.$$

In the above expression, n may represent the number of terms in $\text{Req}_i$. Client device 210 may then calculate a final value of $\mu_u$ for all terms in $\text{Req}_i$ as follows:

$$\mu_u = \frac{\mu_u}{d}.$$

For example, client device 210 may calculate a value of $\mu_u$ as follows:

---

$\mu_u = 0$
  For each $\text{Req}_i$ in D:
    $s_i = 0$
    For each term t appearing in $\text{Req}_i$:
      Let k be the index of t in TermList, i.e., TermList[k] = t
      $s_i = s_i + \text{Cosine}(C[j], C[k], d)$
      n = number of terms in $\text{Req}_i$
    $\mu_u = \mu_u + \frac{s_i}{n}$
  $\mu_u = \frac{\mu_u}{d}.$

---

Similarly, client device 210 may determine the average cosine distance of term u with all terms. For example, client device 210 may calculate the following:

$$\gamma_u = \frac{\sum_{i=1}^{i=t} \text{Cosine}(C[j], C[i], d)}{t}$$

where $\gamma_u$ may represent the average cosine distance for term u with all terms in the list of terms TermList, Cosine(C[j], C[i], d) represents the cosine distance between the j-th value of co-occurrence matrix C and the i-th value of co-occurrence matrix C, d represents the quantity of requirements in the list of requirements D, and t represents the quantity of terms in the list of terms TermList.

Client device 210 may determine the cosine similarity based on calculating an average of the average cosine distance of term u with all requirements and the average cosine distance of term u with all terms. For example:

$$\theta_u = \frac{\mu_u + \gamma_u}{2}.$$

In the above expression, $\theta_u$ may represent the cosine similarity of term u, $\mu_u$ may represent the average cosine distance of term u with all requirements, and $\gamma_u$ may represent the average cosine distance of term u with all terms.

In some implementations, client device 210 may select top themes based on the headings list. For example, client device 210 may sort a list of entity tags (e.g., tags associated with a noun term and/or a noun phrase) Ln based on the cosine similarity $\theta_u$ of the associated entity terms. In this case, client device 210 may determine the dominant themes based on the sorted list of entity tags Ln and the list of section headings Lh. For example, client device 210 may determine a quantity of dominant themes N. In some implementations, client device 210 may receive an indicator, from a user of client device 210, of the quantity of dominant themes that are to be determined. For example, a user of client device 210 may indicate that client device 210 is to determine a particular quantity of entity terms (e.g., nouns, noun phrases, etc.) to be dominant themes, a particular percentage of the total quantity of entity terms to be dominant themes, etc. Based on the quantity of dominant themes N, client device 210 may determine a list of top themes Xn (e.g., the top a themes, to be includes in the list, based on the sorted list of entity terms Ln).

Client device 210 may determine whether term u, included in the list of top themes Xn, is also included in the section headings list Lh. If the term is not included in the section headings list Lh, then a data structure InHeadings[u] (e.g., a matrix tracking whether terms are included in the section headings list Lh) may be set to a particular quantity (e.g., 0). If the term is included in the section headings list Lh, then the matrix InHeadings[u] may be calculated as following:

$$InHeadings[u] = \frac{1}{\text{number of words in } t}$$

where InHeadings[u] represents the data structure tracking whether terms are included in the section headings list Lh and t is the heading term that includes term u. A value of InHeadings[u] may, for example, range from [0, 1], where 0 may indicate that term u is not included in the section headings list Lh, 1 may indicate that term u is included in a single word term of the section headings list Lh, and an intermediate value may indicate that term u is included in a word of a multi-word term of the section headings list Lh.

In some implementations, client device 210 may determine the quantity of terms u included in the list of top themes Xn for which the associated value of InHeadings is 1 and assign the quantity to z. When z is less than a (e.g., where a represents the quantity of top terms to be included in the list), client device 210 may select the terms of the list of top themes Xn for which the associated value of InHeadings is 1 as the list of entity themes, EntityThemes, and may sort the terms based on the associated cosine similarity scores. Additionally, or alternatively, when z is not less than a, client device 210 may select terms of the list of top themes Xn for which the associated value of InHeadings is 1 to be included in EntityThemes, and may select an additional quantity of terms of the list of top themes Xn (e.g., a minus z terms of the list of top themes Xn) to be included in EntityThemes. In this case, client device 210 may sort the terms of EntityThemes based on the value of InHeadings and/or the cosine similarity score associated with the terms.

Similarly, client device 210 may generate a list of top action themes, ActionThemes, based on cosine similarity scores of the action terms (e.g., verb terms and/or verb phrases). For example, client device 210 may calculate a cosine similarity score for each action term, compare the top action terms with the headings list, and may prioritize the action terms in a manner discussed herein in connection with generating the list of entity themes.

Client device 210 may select a particular quantity of themes from a list of themes (e.g., EntityThemes, ActionThemes, etc.) as top themes, in some implementations. For example, client device 210 may select a first quantity of entity themes and a second quantity of action themes as top themes. The weighting of the first quantity and second quantity may be calculated as follows:

$$\Delta_e = \Sigma_{u \in EntityThemes} \theta_u$$

$$\Delta_a = \Sigma_{u \in ActionThemes} \theta_u$$

where $\Delta_e$ represents the summation of the cosine similarity scores for each term u in the EntityThemes list, $\theta_u$ represents the cosine similarity score for a particular term u, and $\Delta_a$ represents the summation of the cosine similarity scores for each term u in the ActionThemes list.

Client device 210 may determine the first quantity and the second quantity based on the relative weights (e.g., $\Delta_e$, and $\Delta_a$) for entity terms and action terms. For example:

$$NumOfTopEntityThemes = \alpha\left[\frac{\Delta_e}{\Delta_e + \Delta_a}\right]$$

$$NumOfTopActionThemes = \alpha - NumOfTopEntityThemes$$

where NumOfTopEntityThemes represents the first quantity (e.g., a quantity of entity themes to be selected as top themes from EntityThemes), NumOfTopActionThemes represents the second quantity (e.g., a quantity of action themes to be selected from ActionThemes), a represents the total quantity of top themes to be selected, $\Delta_e$ represents the relative weight for selecting entity themes, and $\Delta_a$ represents the relative weight for selecting action themes. For example, client device 210 may select the first quantity of top entity themes (e.g., the first NumOfTopEntityThemes from EntityThemes) and the second quantity of top action themes (e.g., the first NumOfTopActionThemes from ActionThemes) to populate a combined data structure storing an indication of the top (e.g., dominant) themes (e.g., a list, L).

Client device 210 may receive information associated with identifying themes from a user of client device 210, in some implementations. For example, client device 210 may provide the list of top themes to the user and the user may modify the list by adding themes (e.g., terms included in the text that were not identified as themes), removing themes, etc.

As further shown in FIG. 4, process 400 may include determining theme sets based on identifying the dominant themes (block 440). For example, client device 210 may group the top themes into one or more theme sets. A theme set may refer to a grouping of themes for which a common association has been specified. For example, client device 210 may group themes as theme sets based on user input indicating themes that are to be grouped. Additionally, or alternatively, client device 210 may generate theme sets by a theme clustering technique, by theme set expansion, or the like.

Client device 210 may generate theme sets using theme set expansion, in some implementations. For example, client device 210 may group one or more themes into a theme set (e.g., a multi-theme theme set, a singleton theme set, etc.), and may expand the theme set by including, in the theme set, one or more terms (e.g., multi-word terms present in TermList) that overlap with the one or more themes of the theme set. For example, when a theme set includes themes such as "Home," "Site," "Brown Fields," etc., client device 210 may add overlapping themes (e.g., multi-word terms for which one of the words matches a theme in the theme set), such as "Home Page," "Web Site," "Brown Fields Property," etc.

Client device 210 may generate theme sets based on user input and/or theme set prioritization, in some implementations. For example, client device 210 may receive input indicating one or more theme sets to be generated and a prioritization associated with the one or more theme sets. Client device 210 may generate a set of user-defined theme sets (e.g., UserThemeSets), and may adjust a determination of the average similarity of the one or more theme sets based on the prioritization associated with the one or more theme sets.

As an example, client device 210 may combine user-defined theme sets with singleton theme sets (e.g., theme sets formed from top themes not associated with a multi-theme theme set) to form a data structure storing indicators of theme sets (e.g., $L_{ThSets}$). For example, client device 210 may calculate $L_{ThSets}$ as a union of top themes in L and user-defined theme sets in UserThemeSets (e.g., where theme set list $L_{ThSets}$=[thSet$_1$, thSet$_2$, . . . , thSet$_k$], and where thSet$_k$ represents the k-th theme set). In this case, thSet$_k$ may represent a multi-theme theme set, a singleton theme set, etc.

Client device 210 may determine an average theme set similarity score for each theme set based on the average similarity score for each term u in the theme set. For example:

$$\theta_{ThSet}[j] = \frac{\sum_{u \in L_{ThSet}[j]} \theta_u}{t}$$

where $\theta_{ThSet}[j]$ represents a matrix storing indicators of the average theme set similarity score for theme set $L_{ThSets}[j]$ (e.g., thSet$_j$), $\Sigma\theta_u$ is the summation of the cosine similarity score $\theta_u$ of all terms u in theme set $L_{ThSets}[j]$, and t represents the quantity of terms u in theme set $L_{ThSets}[j]$.

Client device 210 may sort elements of $L_{ThSets}$ based on the associated average theme set similarity scores in $\theta_{ThSet}$. In some implementations, client device 210 may allow the user to reorder theme sets of $L_{ThSets}$ into a new ordered list of theme sets (e.g., where user ordered theme set list $L_{new}$=[thSet$_{i1}$, thSet$_{i2}$, . . . , thSet$_{ik}$], where thSet$_{ik}$ represents the ik-th theme set, and where ik=k).

Client device 210 may back-propagate theme set similarity scores based on a user-specified order of $L_{new}$ in some implementations. For example, client device 210 may search the list $L_{new}$ to identify an index value α for each item j (e.g., where j∑[1, . . . , k]) in the list $L_{ThSets}$ such that $L_{ThSets}[j]$= $L_{new}[α]$. Client device 210 may set index values for each item j as NewIndex[j]=α.

Client device 210 may reorder the theme sets as follows, for each j:

thSet=$L_{ThSets}[j]$

CH[j]=$\theta_{ThSet}$[NewIndex[j]]-$\theta_{ThSet}[j]$ where CH[j] represents a reordered list of theme sets.

For each value of j, and for each value of u in the theme set (e.g., u∈thSet), client device 210 may determine a theme set with a lowest index value that contains u. For example, client device 210 may find a value l, where l≤j, where u∈$L_{ThSets}[l]$, and there is no l'<l such that u∈$L_{ThSets}[l']$. If l<k, client device 210 may set an overlap flag to true (e.g., $L_{overlap}[u]$=True, indicating that there is a theme with an overlap with another theme set), and may increment a delta value Δ (e.g., which may initially be set to zero, prior to determining value of l) as follows:

Δ=Δ+CH[j]-CH[l].

If l≥k, client device 210 may set an overlap flag to false (e.g., $L_{overlap}[u]$=False, indicating that there is not a theme with an overlap with an earlier theme set), and may increment a counter value c (e.g., which may initially be set to zero, prior to determining value of l) by one, such that c=c+1. A final value of c, after processing all themes, may indicate a quantity of themes that do not have an overlap with another theme set.

If the final value of c is greater than zero, client device 210 may modify a value of Δ as follows:

$$\Delta = \frac{\Delta}{c} + CH[j]$$

where Δ represents the effective change for non-overlapping terms in the current theme set.

Additionally, or alternatively, if the final value of c is greater than zero, client device 210 may, for each u∈thSet where $L_{overlap}[u]$=False and for each u' different from u (e.g., for each u'≠u∈T), modify a value of a semantic similarity SemSim[u, u'] as follows:

SemSim[u,u']=SemSim[u,u']+Δ.

Additionally, or alternatively, when client device 210 has been configured to utilize latent semantic indexing, client device 210 may modify a value of SemSim[u, Req], for each requirement (Req) as follows:

SemSim[u,Req]=SemSim[u,Req]+Δ.

Client device 210 may generate theme sets based on a clustering technique, in some implementations. For example, client device 210 may utilize weighted connected component based clustering to generate theme sets by determining semantic similarity between theme sets, selecting theme sets with a highest semantic similarity (e.g., relative to other theme sets), forming a cluster from the selected theme sets, determining a centroid similarity associated with one or more clusters, merging theme clusters based on the centroid similarity, and providing the merged clusters as theme sets.

As an example, client device 210 may calculate a semantic similarity for each singleton theme set (e.g., each theme set that includes a single theme) in $L_{ThSets}$ with each other singleton theme set in $L_{ThSets}$ (e.g., for each theme set pair (th$_i$, th$_j$) in the Cartesian product of $L_{ThSets}$ and $L_{ThSets}$). When client device 210 has been configured to utilize latent semantic indexing, client device 210 may calculate a semantic similarity score based on truncated matrix U as X[i,j]= Cosine(U[i], U[j], k). Additionally, or alternatively, when client device 210 has been configured not to utilize latent semantic indexing, client device 210 may calculate the semantic similarity score based on co-occurrence matrix C as X[i,j]=Cosine(C[i], C[j], k).

Client device 210 may sort the list of theme set pairs (e.g., that include each theme set pair (th$_i$, th$_j$) in the Cartesian product of $L_{ThSets}$ and $L_{ThSets}$) based on the calculated semantic similarity score, in some implementations. From the sorted list of theme set pairs, client device 210 may select a threshold percentage of theme set pairs (e.g., 25 percent of top theme set pairs), and may store an indicator of the selected theme set pairs via a new data structure (e.g., a list $L_n$). In this case, client device 210 may remove theme set pairs from the new data structure that have a cosine distance less than or equal to a particular quantity (e.g., less than or equal to 0).

Client device 210 may determine a clustering parameter, in some implementations. For example, client device 210 may select a theme set pair from list $L_n$ based on a threshold point, and may define a parameter based on the selected theme set pair, in some implementations. For example, client device 210 may select theme pair ($th_a$, $th_b$), and may calculate parameter conTh=X[a,b].

Client device 210 may generate theme sets based on cluster merging, in some implementations. For example, client device 210 may form a cluster $C_i$ for each theme in L, and may merge a pair of clusters ($C_i$, $C_j$) based on determining the centroid similarity between the pair of clusters. The centroid similarity for a pair of clusters may be calculated as follows:

$$CenSim[i, j] = \frac{\sum_{th_{l1} \in C_i \text{ AND } th_{l2} \in C_j} X[l1, l2]}{|C_i| * |C_j|}$$

where CenSim[i,j] represents a data structure storing indicators of the centroid similarity of a pair of clusters ($C_i$, $C_j$), X[l1, l2] represents the cosine similarity for a pair of themes included in the pair of clusters ($C_i$, $C_j$), $C_i$ represents a cluster of one or more themes $th_{l1}$, and $C_j$ represents a cluster of another one or more themes $th_{l2}$).

As an example, client device 210 may determine a particular pair of clusters with a maximum centroid similarity as compared with other pairs of clusters. In this case, if the centroid similarity associated with the particular pair of clusters is greater than a configuration parameter (e.g., the clustering parameter conTh), client device 210 may merge the pair of clusters, in some implementations. For example, for maximum centroid similarity cluster pair ($C_l$, $C_m$), client device 210 may merge $C_m$ into $C_l$, and may remove $C_m$ from C. In some implementations, client device 210 may iteratively merge clusters based on the maximum centroid similarity for the set of clusters being determined to be greater than conTh. For example, client device 210 may determine centroid similarity for another pair of clusters based on merging $C_m$ into $C_l$. In this case, when client device 210 determines that the maximum centroid similarity for the set of clusters is less than or equal to conTh, client device 210 may include the set of clusters as theme sets in the list of generated theme sets L.

In some implementations, client device 210 may generate a combined set of theme sets by merging a user-defined set of theme sets and a generated set of theme sets. For example, client device 210 may merge the list of user-defined theme sets into the list of generated theme sets as follows:

$$L = L \cup UserThemeSets$$

where L represents the list of generated theme sets (e.g., a list of singleton themes, a list of theme set expansion theme sets, a list of cluster based theme sets, etc.) and UserThemeSets represents the list of user defined theme sets.

Client device 210 may generate a graph based on the cosine similarity score for top theme set pairs, in some implementations. For example, client device 210 may generate a graph, G[n,n], based on the cosine similarity scores for each top theme set pair, ($th_i$, $th_j$). In this case, client device 210 may determine that for theme pairs ($th_i$, $th_j$) that are elements of the list, $L_n$, the value of G[i,j]=X[i,j] (e.g., the cosine similarity of pairs $th_i$ and $th_j$). Additionally, or alternatively, for theme pairs ($th_i$, $th_j$) that are not elements of $L_n$, client device 210 may assign the value of G[i,j]=0.

As further shown in FIG. 4, process 400 may include generating requirement clusters associated with one or more theme sets of the determined theme sets (block 450). For example, client device 210 may generate one or more requirement clusters, and may associate one or more theme sets with each of the one or more requirement clusters. A requirement cluster may refer to a grouping of one or more requirements that are determined to have a relation to other requirements of the cluster based on a semantic similarity, a placement similarity, a theme set association similarity, or the like.

As described in more detail in connection with FIG. 7, generating requirement clusters may include determining requirement proximity (e.g., a measure of granularity between pairs of requirements), performing one or more clustering techniques (e.g., hierarchical agglomerative clustering, requirement clustering around theme sets, weighted connected component based requirement clustering, etc.) to generate requirement clusters, determining a relationship between one or more theme sets and the generated clusters, associating the one or more theme sets and the generated clusters, determining information associated with the requirement clusters (e.g., a central requirement, a quantity of clusters associated with a cluster level, etc.), or other processing described elsewhere herein.

As further shown in FIG. 4, process 400 may include providing information associated with the requirements clusters (block 460). For example, client device 210 may provide information associated with the requirements clusters based on generating the requirement clusters. In some implementations, client device 210 may provide information associated with the requirement clusters via a user interface. For example, client device 210 may provide a user interface that includes information identifying requirement clusters, cluster aggregation levels (e.g., clusters sorted by cluster level), themes, theme sets, outlier requirements, potentially underspecified requirements, similarity scores used to determine provided information, or the like. Additionally, or alternatively, client device 210 may provide information associated with the requirement clusters to server device 220 (e.g., for processing, storage, retransmission, display, etc.).

In some implementations, providing information associated with the requirement clusters may include identifying one or more isolated requirements. An isolated requirement may refer to a requirement that is determined to be poorly connected to other requirements (e.g., an outlier requirement), potentially underspecified in the text (e.g., an underspecified requirement), or the like. For example, client device 210 may determine isolated requirements by calculating an average semantic similarity score for a requirement with each other requirement, by calculating a metric for the total information associated with each requirement, by providing a first quantity of requirements as outlier requirements based on comparing the semantic similarity scores of the first quantity of requirements with a configuration parameter, and by providing a second quantity of requirements as potentially underspecified requirements based on the total information metrics associated with the second quantity of requirements.

In some implementations, client device 210 may calculate an average semantic similarity for a requirement with each other requirement as follows:

For each requirement $Req_i$ in D:
    $\mu_i = 0$; $n = 0$;
    For each requirement $Req_j$ in D:
        If(SemSim[i, j] $\geq \Delta$)
            $\mu_i = \mu_i + SemSim[i, j]$
            $n = n + 1$
    If $\left(n < \min\left\{1, \frac{|D|}{\alpha}\right\}\right)$
        $\mu_i = 0$
    Else
        $\mu_i = \frac{\mu_i}{n}$.

In the above expression, $\mu_i$ may represent the average semantic similarity for a particular requirement with each other requirement of the set of requirements, and SemSim may represent a function for determining the semantic similarity for the particular requirement with another particular requirement. Also, $\Delta$ may represent a threshold (e.g., a configuration parameter to be set by the user, with default value of, for example $\Delta$=0.7) for setting the lower bound on the strength of semantic relatedness between requirements, a (e.g. a configuration parameter) may represent an integer >=1, with a default value of, for example, 100, and l may represent a small integer (e.g., a configuration parameter) with a default value of, for example, 5.

Based on the average semantic similarity, client device 210 may provide a quantity of outlier requirements, of the set of requirements, for which the average semantic similarity associated with each requirement of the quantity of outlier requirements satisfies a configuration parameter (e.g., $\mu_i < \delta$, where $\delta$ is a configuration parameter).

Providing information associated with the requirement clusters may include providing a total information metric, in some implementations. Client device 210 may calculate the total information metric, Info(Req$_i$), for each particular requirement based on term frequency-inverse document frequency (tf-idf) values for each term occurring in the particular requirement, as discussed herein in connection with FIG. 7. Based on the total information metric, client device 210 may determine a quantity of requirements (e.g., potentially underspecified requirements) associated with the lowest total information metric values of the set of requirements. For example, client device 210 may determine the quantity of potentially underspecified requirements based on a user defined threshold quantity, a default threshold quantity, or the like. In this case, client device 210 may provide the quantity of potentially underspecified requirements.

In this way, client device 210 may mine themes from a text, may group mined themes into theme sets, may group requirements into coherent clusters associated with the theme sets, and may provide information associated with the requirements, thereby facilitating requirements analysis on a requirements document.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
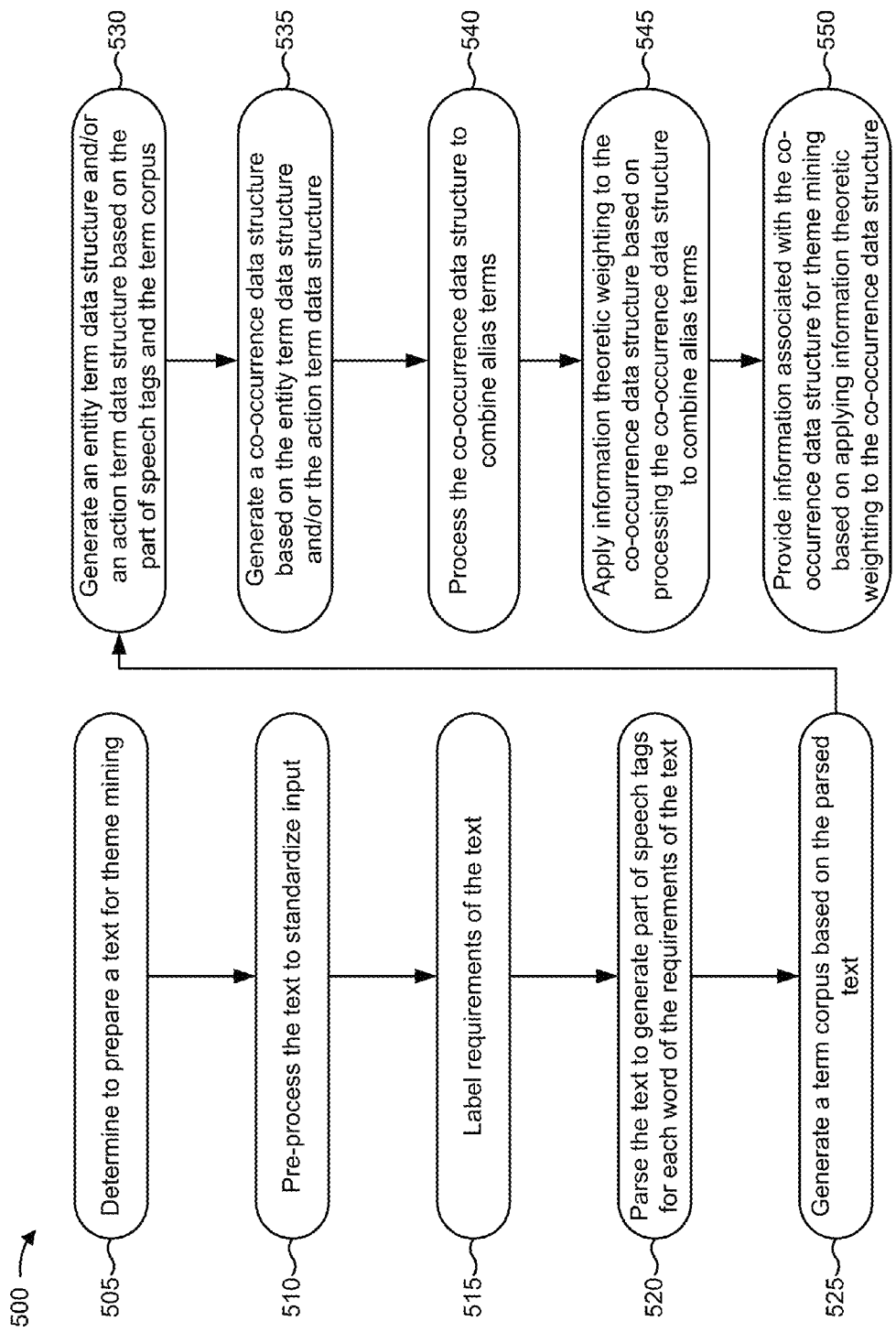
FIG. 5 is a flow chart of an example process for preparing a natural language specification of system requirements for theme mining.

FIG. 5 is a flow chart of an example process 500 for preparing a natural language specification of system requirements for theme mining. In some implementations, process 500 may correspond to process block 420. In some implementations, one or more process blocks of FIG. 5 may be performed by client device 210. In some implementations, one or more process blocks of FIG. 5 may be performed by another device or a group of devices separate from or including client device 210, such as server device 220.

As shown in FIG. 5, process 500 may include determining to prepare a text for theme mining (block 505). For example, client device 210 may determine to prepare the text for theme mining based on a user request. Additionally, or alternatively, client device 210 may determine to prepare the text for theme mining based on user interaction with a user interface. In some implementations, determining to prepare the text for theme mining may include obtaining the text. For example, client device 210 may obtain the text from memory and/or from another device, such as a storage device, server device 220 (e.g., via a network), or the like.

Determining to prepare the text for theme mining may include determining text sections to be processed, in some implementations. For example, client device 210 may partition the text into sections and may process particular sections of the text. In some implementations, client device 210 may determine sections of the text to process based on a user interaction, based on an indication from server device 220, or the like.

As further shown in FIG. 5, process 500 may include pre-processing the text to standardize input (block 510). For example, client device 210 may process portions of the text to standardize the text for processing. In some implementations, pre-processing the text may include adjusting characters, such as by removing characters, replacing characters, adding characters, adjusting a font, adjusting formatting, adjusting spacing, or the like.

As further shown in FIG. 5, process 500 may include labeling requirements of the text (block 515). For example, client device 210 may determine requirements to be labeled, and may label one or more requirements. A requirement may include a portion of the text. For example, client device 210 may receive input indicating a manner in which the text is to be partitioned into portions, and client device 210 may partition the text into portions based on the indication. A text portion (e.g., a requirement) may include, for example, a sentence, a line, a paragraph, a page, a document, etc. In some implementations, client device 210 may label each text portion (e.g., each requirement), and may use the labels when processing the text to determine alias terms. Additionally, or alternatively, client device 210 may process each text portion separately (e.g., serially or in parallel).

In some implementations, client device 210 may determine one or more unique identifiers to be associated with requirements of the text. In some implementations, client device 210 may generate a data structure storing requirement identifiers. For example, client device 210 may generate a list of requirement identifiers D of size d (e.g., with d elements), where d is equal to the number of unique requirements in the requirements document (e.g., where unique requirements list D=[Req$_1$, Req$_2$, ..., Req$_d$]). In some implementations, client device 210 may label requirements of the text based on processing the text. For example, client device 210 may process the text to identify the requirements, such as by identifying a text portion included in the text (e.g., a requirement may include a sentence, a phrase, a paragraph, a heading, a section under a heading, etc.). Additionally, or alternatively, client device 210 may receive an indication of the requirements, such as a set of requirement tags, a user identification of the requirements, or the like.

As further shown in FIG. 5, process 500 may include parsing the text to generate part of speech tags for each word of the requirements of the text (block 520). For example, client device 210 may receive information that identifies one or more tags, and may associate the tags with words in the text based on tag association rules. The tag association rules may specify a manner in which the tags are to be associated with the words based on characteristics of the words. For example, a tag association rule may specify that a singular noun tag ("/NN") is to be associated with words that are singular nouns (e.g., based on a language database, a context analysis, etc.).

A word, as used herein, may refer to a unit of language, consisting of one or more characters. A word may include a dictionary word (e.g., "gas") or may include a non-dictionary string of characters (e.g., "asg"). In some implementations, a word may be a term. Alternatively, a word may be a subset of a term (e.g., a term may include multiple words). Client device 210 may determine words in the text by determining characters identified by one or more delimiting characters, such as a space, a punctuation mark (e.g., a comma, a period, an exclamation point, a question mark, etc.), or the like.

As an example, client device 210 may receive a list of part-of-speech tags (POS tags) and tag association rules for tagging words in the text with the POS tags based on the part-of-speech of the word. For example, client device 210 may receive text that includes the following sentence:

The gasoline engine powers the car.

Client device 210 may tag the sentence with POS tags, as follows:

the/DT
gasoline/NN
engine/NN
powers/VB
the/DT
car/NN.

In the above tagged sentence, DT may represent a determiner tag (e.g., used to tag articles like a, an, and the), NN may represent a singular noun or mass noun tag (e.g., used to tag singular or mass nouns), and VB may represent a base-form verb tag (e.g., used to tag verbs in base form). These tags are provided as an example, and client device 210 may use additional or other tags in some implementations, as described elsewhere herein.

In some implementations, client device 210 may further process the tagged text to associate additional or alternative tags with groups of words that meet certain criteria. For example, client device 210 may associate an entity tag (e.g., ENTITY) with noun phrases (e.g., consecutive words with a noun tag). Client device 210 may apply entity tags and/or action tags to the tagged text, as follows:

the/DT
{gasoline engine}/ENTITY
powers/ACTION
the/DT
car/NN.

As can be seen, the nouns "gasoline" and "engine" have been combined into a single term "gasoline engine" (e.g., set off by braces { }), and have been tagged with an entity tag. In some implementations, client device 210 may only process terms with particular tags, such as noun tags, entity tags, verb tags, action tags, etc., when determining alias terms.

As further shown in FIG. 5, process 500 may include generating a term corpus based on the parsed text (block 525). For example, client device 210 may generate a list of unique terms associated with one or more tags. The term corpus (e.g., a term list) may refer to the set of terms (e.g., single word terms, multi-word terms, etc.) extracted from the text. In some implementations, the term corpus may include terms tagged with a noun tag, or a tag derived from a noun tag (e.g., an entity tag associated with a noun term). Additionally, or alternatively, the term corpus may include terms tagged with a verb tag, or a tag derived from a verb tag (e.g., an action tag associated with a verb term). Additionally, or alternatively, the term corpus may include terms extracted from section headings of the text.

Client device 210 may convert terms to a root form when adding the terms to the list of unique term, in some implementations. For example, the terms "processes," "processing," "processed," and "processor" may all be converted to the root form "process." Similarly, the term "devices" may be converted to the root form "device." Thus, when adding terms to the list of unique terms, client device 210 may convert the terms "processing device," "processed devices," and "processor device" into the root form "process device." Client device 210 may add the root term "process device" to the list of unique terms.

Generating a term corpus may include generating a data structure storing terms extracted from the text, in some implementations. For example, client device 210 may generate a list of terms TermList of size t (e.g., with t elements), where t is equal to the number of unique terms in the requirements document (e.g., where unique terms list TermList=[$term_1$, $term_2$, . . . , $term_t$]).

As further shown in FIG. 5, process 500 may include generating an entity term data structure and/or an action term data structure based on the part of speech tags and the term corpus (block 530). For example, client device 210 may process the term corpus and the POS tags associated with terms in the term corpus to categorize a term as an entity term (e.g., a noun), an action term (e.g., a verb), a section heading term (e.g., a term extracted from a section heading), or the like. In this case, client device 210 may generate a list of entity terms, Ln, and/or a list of action terms, Lv. Additionally, or alternatively, client device 210 may generate a list of heading terms (e.g., terms extracted from section headings), Lh.

As further shown in FIG. 5, process 500 may include generating a co-occurrence data structure based on the entity term data structure and/or the action term data structure (block 535). For example, client device 210 may generate a term occurrence matrix C of size t×d (e.g., with t rows and d columns), where t is equal to the number of unique terms in the requirements document (e.g., where unique terms list TermList=[$term_1$, $term_2$, . . . , $term_t$]), and where d is equal to the number of unique requirements in the requirements document (e.g., where unique requirements list D=[$Req_1$, $Req_2$, . . . , $Req_d$]). The co-occurrence matrix C may store an indication of a quantity of times that each term appears in each requirement (e.g., in each sentence, where a requirement is a sentence). For example, a value stored at C[i, j] may represent a quantity of times that the i-th term (e.g., $term_i$ from the TermList) is included in the j-th requirement section (e.g., $Req_j$ from D). A single row in occurrence matrix C may be referred to as a term vector, and may represent a frequency of occurrence of a single term in each requirement. A single column in occurrence matrix C may be referred to as a requirement vector, and may represent the frequency of occurrence of each term, included in the list of unique terms TermList, in a single requirement.

As further shown in FIG. 5, process 500 may include processing the co-occurrence data structure to combine alias terms (block 540). For example, client device 210 may merge two or more rows (e.g., term vectors) in matrix C. Client device 210 may merge rows by summing values in the rows that correspond to the same column (e.g., requirement vector). For example, client device 210 may merge a first row and a second row by summing the first value in the first row and the first value in the second row, by summing the second value in the first row and the second value in the second row, by summing the j-th value in the first row and the j-th value in the second row, etc. The summed values may be represented in a single row (e.g., a single term vector), and may be associated with one or more of the terms associated with the merged rows.

Client device 210 may merge rows based on a syntactic analysis and/or a semantic analysis of the terms associated with the rows. For example, client device 210 may merge rows based on determining that the terms associated with the rows are misspelled alias terms, short form alias terms, explicit alias terms, etc. Additionally, or alternatively, client device 210 may merge rows based on determining that an alias score for a semantic analysis technique (e.g., a technique other than latent semantic analysis, such as tag-based analysis, transitive analysis, co-location analysis, glossary analysis, etc.) satisfies a threshold.

As further shown in FIG. 5, process 500 may include applying information theoretic weighting to the co-occurrence data structure based on processing the co-occurrence data structure to combine alias terms (block 545). For example, client device 210 may apply information theoretic weighting to adjust the values in matrix C. In this case, client device 210 may determine an inverse document frequency (idf) factor corresponding to a particular term (e.g., row) and requirement (e.g., column) based on the total number of requirements d and the number of requirements in which the term appears. For example, client device 210 may determine the idf factor for a particular term and requirement by dividing the total number of requirements d by the number of requirements in which the term appears, and by taking a logarithm of that quotient. In some implementations, client device 210 may apply information theoretic weighting to adjust the values of the co-occurrence matrix as follows:

$$C[i, j] = C[i, j] \times \ln\left(\frac{d}{n_i + 1}\right),$$

for each i in t and each j in d.
where C[i,j] represents the co-occurrence matrix value (e.g., a frequency quantity) for a particular term in a particular requirement, d represents the total number of requirements, and $n_i$ represents the number of requirements that include $term_i$.

In some implementations, when client device 210 determines that latent semantic indexing is to be performed, client device 210 may generate a low-rank approximation of the co-occurrence matrix with the adjusted values. For example, client device 210 may apply singular value decomposition (SVD) to co-occurrence matrix C, to determine matrices U, Σ, and $V^T$, such that:

$$C = U \Sigma V^T,$$

where C represents the co-occurrence matrix (e.g., with or without the merged rows and/or with or without the adjusted values), U represents a t×t unitary matrix, Σ represents a t×d rectangular diagonal matrix with nonnegative real numbers on the diagonal, and $V^T$ (the conjugate transpose of V) represents a d×d unitary matrix. The diagonal values of Σ (e.g., $\Sigma_{i,j}$) may be referred to as the singular values of matrix C.

Client device 210 may determine a truncation value k for reducing the size of matrix U, which may be useful for calculating a latent semantic similarity score for two terms, as discussed herein in connection with FIG. 4. Client device 210 may determine a quantity of non-zero singular values (e.g., the quantity of non-zero entries in Σ), which may be referred to as the rank r of matrix C, and may set the truncation value k equal to the rank r of matrix C. Alternatively, client device 210 may set the truncation value k equal to $(t \times d)^{0.2}$. In some implementations, client device 210 may set the truncation value k as follows:

If $(t \times d)^{0.2} < r$, then $k = (t \times d)^{0.2}$,

Otherwise, k=r.

Client device 210 may truncate the matrix U by removing columns from U that are not included in the first k columns (e.g., the truncated matrix U may only includes columns 1 through k of the original matrix U). The rows in truncated matrix U may correspond to term vectors in the latent semantic indexing (LSI) space.

As further shown in FIG. 5, process 500 may include providing information associated with the co-occurrence data structure for theme mining based on applying information theoretic weighting to the co-occurrence data structure (block 550). For example, client device 210 may provide information associated with the co-occurrence data structure, such as the term list, the requirement list, the co-occurrence data structure, the truncated co-occurrence data structure, or the like. In some implementations, client device 210 may provide the information via a user interface and/or to another device.

In this way, client device 210 may obtain a text for theme mining, and may process the text to prepare the text for theme mining.

Although FIG. 5 shows example blocks of process 500, in some implementations, process 500 may include additional blocks, different blocks, fewer blocks, or differently arranged blocks than those depicted in FIG. 5. Additionally, or alternatively, two or more of the blocks of process 500 may be performed in parallel.

Figure 6A:
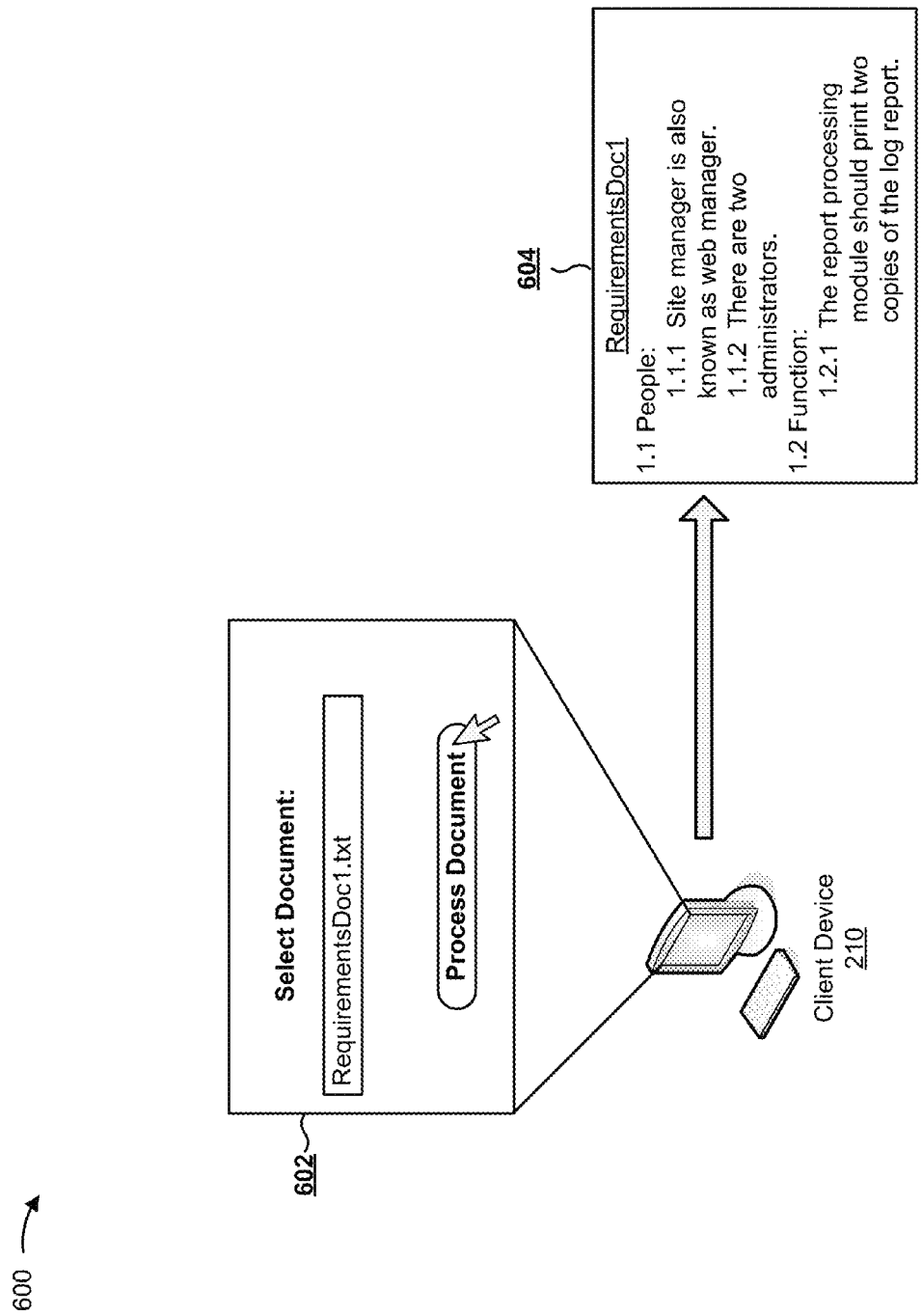

FIGS. 6A-6F are diagrams of an example implementation 600 relating to process 400 shown in FIG. 4 and process 500 shown in FIG. 5. As shown in FIG. 6A, and by reference number 602, assume that a user has identified a requirements document, RequirementsDoc1.txt, to be processed by client device 210. As shown by reference number 604, the requirements document may include various requirements for a system, such as functional requirements, non-functional requirements, or the like. For example, the requirements document may include the sentence "The report processing module should print two copies of the log report," as shown.

Figure 6B:
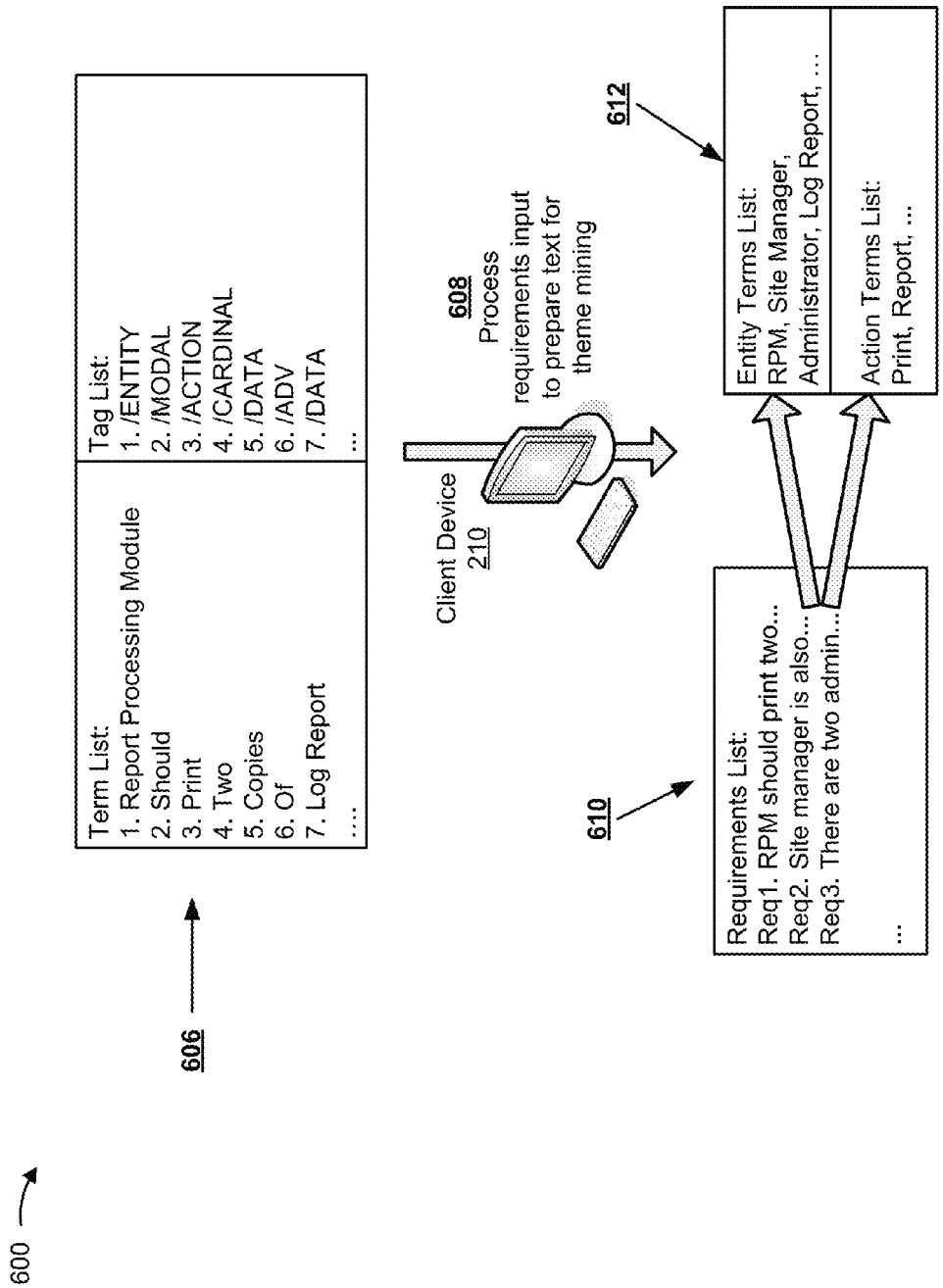

As shown in FIG. 6B, and by reference number 606, client device 210 may process the text to label terms in the text with tags. As shown by reference number 608, client device 210 may process the tagged requirements to prepare the requirements document for theme mining. As shown by reference number 610, client device 210 may determine a list of requirements by analyzing the requirements document. As shown by reference number 612, client device 210 may analyze the list of requirements to determine terms in the requirements with particular tags (e.g., a noun tag, an entity tag, a data tag, an action tag, a verb tag, etc.), and may add one or more terms to an entity terms list or an action terms list based on the tags. As shown, assume that client device 210 has added the terms RPM, Site Manager, Administrator, and Log Report to an entity terms list, and has added the terms Print and Report to an action terms list. Assume that the lists include other terms in addition to those shown.

Figure 6C:
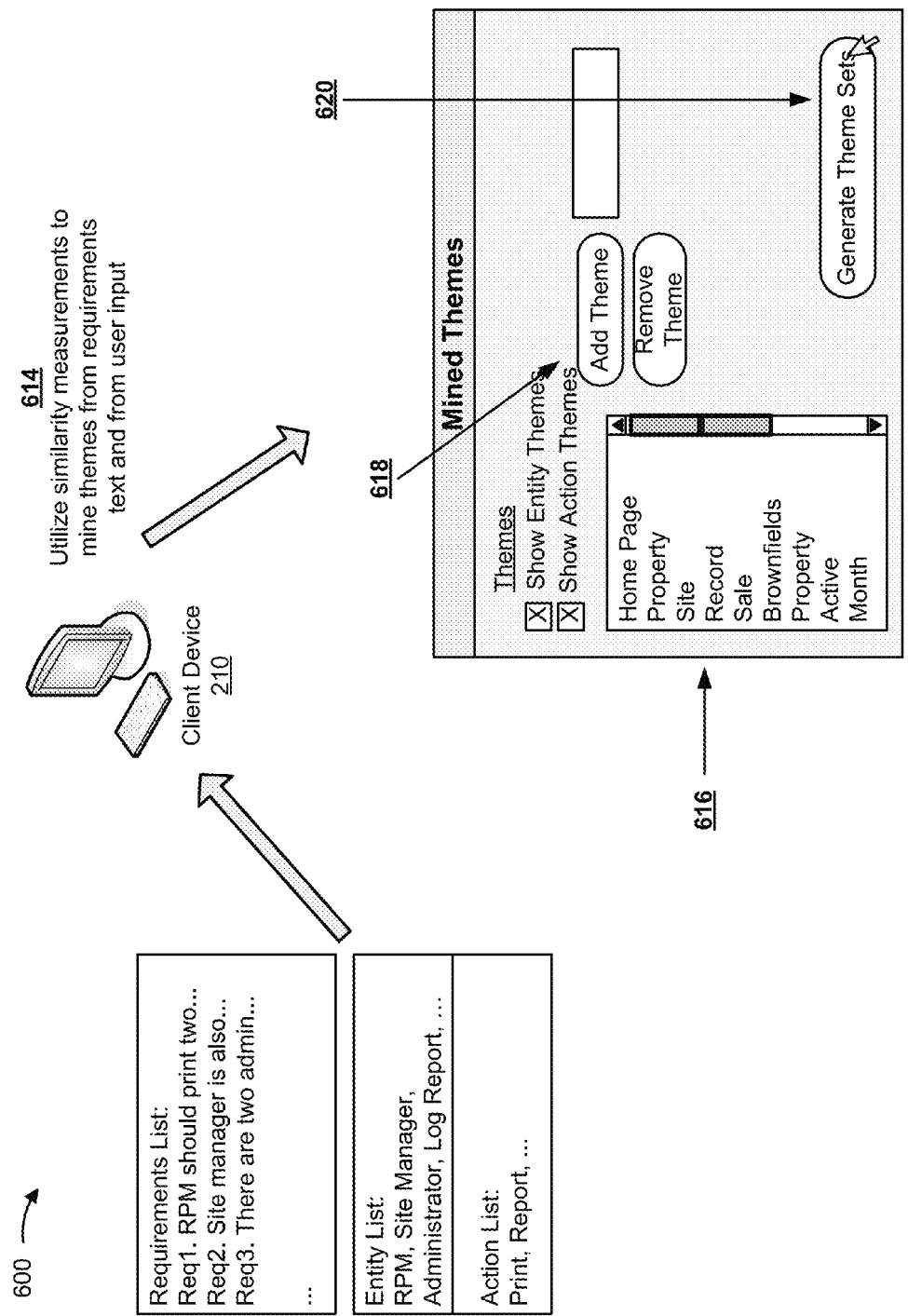

As shown in FIG. 6C, and by reference number 614, client device 210 may calculate one or more similarity measurements between terms to identify themes in the requirements document, and may further receive user input to identify themes in the requirements document. As shown by reference number 616, assume that client device 210 automatically generates a list of themes included in the requirements document, according to one or more techniques described elsewhere herein. As shown by reference number 618, further assume that client device 210 provides an input mechanism for a user to input (e.g., via a text box, via a drop-down box that lists terms included in the requirements document, etc.) a theme to be added to the list of themes.

Assume that the list of themes includes some themes generated by client device 210 and some themes input by a user. As shown by reference number 620, a user may provide input to group themes into theme sets of related themes.

Figure 6D:
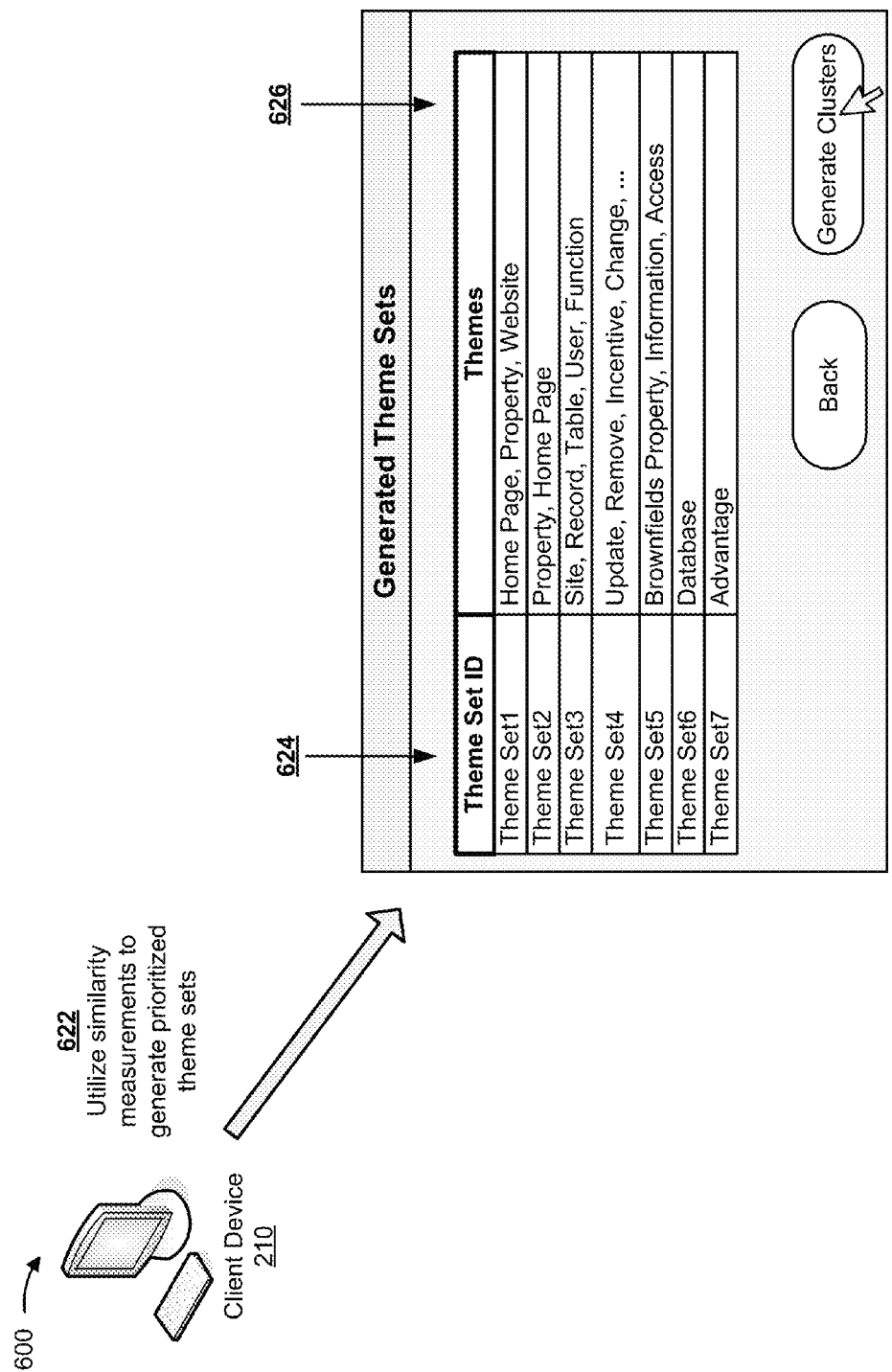

As shown in FIG. 6D, and by reference number 622, client device 210 may use one or more similarity measurement techniques described herein to generate a list of prioritized theme sets. The theme sets may be displayed in an order of descending priority, with a higher priority (e.g., theme set 1) indicating that themes in the theme set have a high similarity (e.g., a higher likelihood of being related than a lower priority theme set), and a lower priority (e.g., theme set 7) indicating that themes in the theme set have a low similarity (e.g., a lower likelihood of being related than a higher priority theme set). As shown by reference number 624, each theme set may be identified using a theme set identifier, and the identifier may indicate a priority associated with the theme set (e.g., theme set 1 may have a higher priority than theme set 2). As shown by reference number 626, client device 210 may provide a list of themes included in each theme set.

Figure 6E:
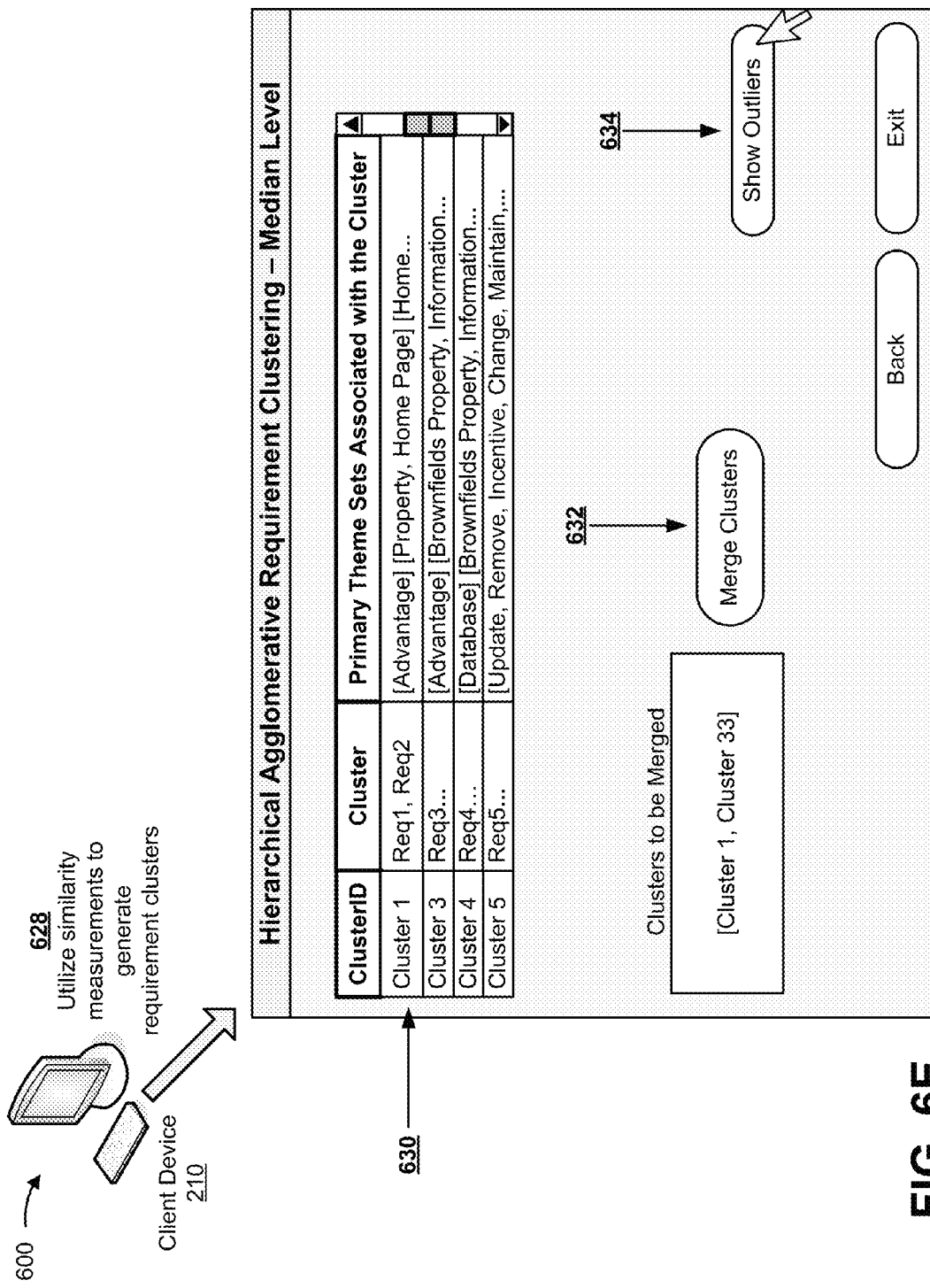

As shown in FIG. 6E, and by reference number 628, client device 210 may use one or more similarity measurement techniques described herein to generate a list of requirement clusters. Based on determining theme sets of related themes, client device 210 may generate requirement clusters of related requirements (e.g., that relate to the same theme set, that include terms in the same theme set, etc.). As shown by reference number 630, client device 210 may assign a cluster identifier to each requirement cluster. A cluster identifier may identify a cluster, and clusters may be provided in an order that indicates a likelihood that requirements in the cluster are related (e.g., requirements in cluster 1 may be more likely to be related than requirements in cluster 2). As shown by reference number 632, a user may select two or more clusters to be merged into a single cluster. As shown by reference number 634, the user may provide input the causes client device 210 to display outlier requirements.

As shown in FIG. 6F, assume that the user has interacted with client device 210 to provide input that causes client device 210 to display outlier requirements. As shown by reference number 636, client device 210 may identify the outlier requirements (e.g., potentially underspecified requirements) based on the generated clusters, and/or based on one or more similarity measurement techniques described herein. For example, client device 210 may determine that a particular requirement is not related to any other requirements (e.g., a requirement is not included in a cluster or is the only requirement in a cluster), is not related to a threshold quantity of requirements (e.g., is related to less than 3 requirements), etc. As shown by reference number 638, client device 210 may provide information that identifies the outlier requirements. This information may indicate that a user should further define the outlier requirements in the requirements document. In some implementations, a user may interact with an outlier requirement (e.g., requirement 43, 44, etc.), such as by clicking on the outlier requirement, and client device 210 may provide the portion of the requirements document corresponding to the outlier requirement so that the user can further define the outlier requirement.

As indicated above, FIGS. 6A-6F are provided merely as an example. Other examples are possible and may differ from what was described with regard to FIGS. 6A-6F.

Figure 7:
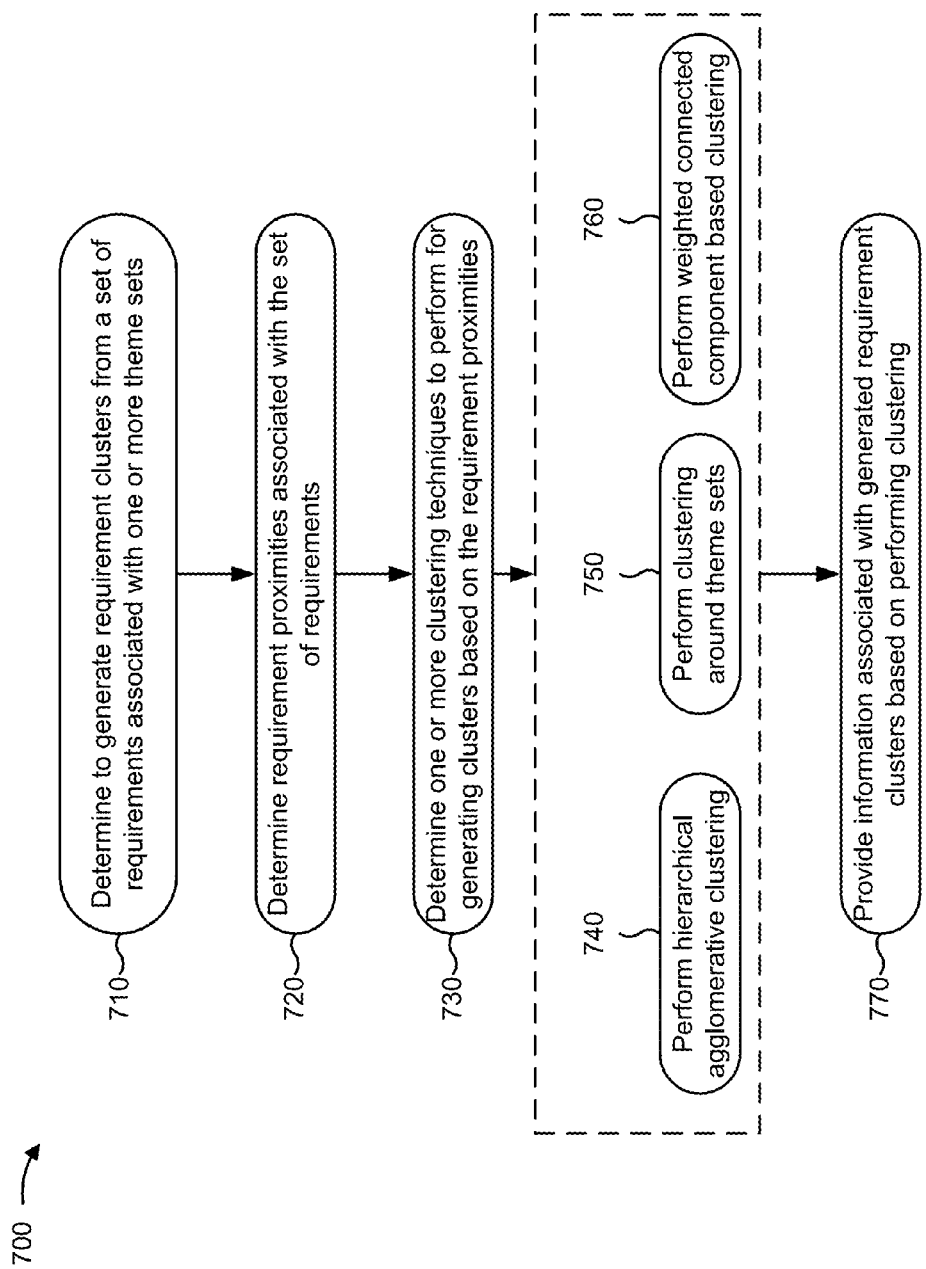
FIG. 7 is a flow chart of an example process for generating requirement clusters based on theme sets.

FIG. 7 is a flow chart of an example process 700 for generating requirement clusters based on theme sets. In some implementations, process 700 may correspond to process block 450. In some implementations, one or more process blocks of FIG. 7 may be performed by client device 210. In some implementations, one or more process blocks of FIG. 7 may be performed by another device or a group of devices separate from or including client device 210, such as server device 220.

As shown in FIG. 7, process 700 may include determining to generate requirement clusters from a set of requirements associated with one or more theme sets (block 710). For example, client device 210 may group requirements, from a set of requirements, into clusters based on one or more similarity measurements. In some implementations, client device 210 may determine to generate requirement clusters based on user input. For example, client device 210 may provide a set of generated theme sets to a user, and the user may provide input indicating that client device 210 is to generate requirement clusters associated with the theme sets. In some implementations, determining to generate requirement clusters may include being provided information associated with one or more configuration parameters. For example, client device 210 may determine a configuration associated with using latent semantic indexing, may determine a particular clustering technique to use, may determine outputs to be provided to a user, or the like.

As further shown in FIG. 7, process 700 may include determining requirement proximities associated with the set of requirements (block 720). For example, client device 210 may determine one or more requirement proximities associated with the set of requirements. A requirement proximity may refer to a measurement of interrelatedness between the requirements (e.g., a set of similarity measurements between a pair of requirements, such as a placement similarity, a semantic similarity, a combined similarity, or the like). For example, client device 210 may determine a semantic similarity based on a cosine distance, a placement similarity based on a Jaccard similarity, a combined similarity based on the semantic similarity and/or the placement similarity, and/or another similarity measurement.

Determining requirement proximity may include determining semantic similarity, in some implementations. For example, client device 210 may determine semantic similarity for a pair of requirements (e.g., SemSim[i,j] for $req_i$ and $req_j$) based on a cosine similarity for the pair of requirements, in some implementations. Semantic similarity for the pair of requirements may refer to the closeness of the two requirements based on a measurement of inter-relatedness of each requirement in the overall context of the text. For example, when client device 210 is to use latent semantic indexing, client device 210 may calculate semantic similarity based on truncated matrix V as SemSim[i,j] =Cosine(V[i], V[i], k). Additionally, or alternatively, where client device 210 is not to use latent semantic indexing, client device 210 may calculate semantic similarity based on co-occurrence matrix C as SemSim[i,j]=Cosine($C^T$[i], $C^T$[j], t) (e.g., where $C^T$ represents a transpose of the co-occurrence matrix C).

Determining requirement proximity may include determining placement similarity, in some implementations. For example, client device 210 may determine placement similarity for a pair of requirements (e.g., PlaceSim[i,j] for $req_i$ and $req_j$) based on a measure of logical separation and granularity of the two requirements with respect to an underlying hierarchical organization of the text. For example, client device 210 may determine the relative placement of a requirement in the hierarchical organization of the text, and may determine the placement similarity based on a Jaccard similarity, as follows:

$$PlaceSim[i, j] = \frac{|P_i \cap P_j|}{|P_i \cup P_j|}$$

where PlaceSim[i,j] represents a matrix storing an indicator of the placement similarity for $req_i$ and $req_j$, $P_i$ represents a set of indicators based on the relative placement of requirement $req_i$ in the hierarchical organization of the text (e.g., one or more heading identifiers), and $P_j$ represents a set of indicators based on the relative placement of requirement $req_j$ in the hierarchical organization of the text (e.g., one or more heading identifiers).

Determining requirement proximity may include determining a combined similarity, in some implementations. For example, requirement proximity may be calculated based on the semantic similarity and the placement similarity (e.g., a combined similarity). In this case, client device 210 may determine the combined similarity score for a pair of requirements based on a weighting of the associated semantic similarity and the placement similarity. For example, client device 210 may select a first weight $\alpha_1$ and a second weight $\alpha_2$ such that $\alpha_1 + \alpha_2 = 1$. In some implementations, the first weight and the second weight may be equivalent (e.g., $\alpha_1 = \alpha_2 = 0.5$). In some implementations, the first weight and the second weight may have different values (e.g., $\alpha_1 = 0.25$ and $\alpha_2 = 0.75$, $\alpha_1 = 1$ and $\alpha_2 = 0$, etc.). Based on determining the first weight and second weight, client device 210 may calculate the combined similarity as follows:

$$ComSim[i,j] = \alpha_1 SemSim[i,j] + \alpha_2 PlaceSim[i,j]$$

where ComSim[i,j] represents the combined similarity for $req_1$ and $req_2$, $\alpha_1$ represents the first weight that is associated with the semantic similarity score, SemSim[i,j] represents the semantic similarity score for $req_1$ and $req_2$, $\alpha_2$ represents the second weight that is associated with the placement similarity score, and PlaceSim[i,j] represents the placement similarity score for $req_1$ and $req_2$.

As further shown in FIG. 7, process 700 may include determining one or more clustering techniques to perform for generating clusters based on the requirement proximities (block 730). For example, client device 210 may determine one or more clustering techniques to perform, to generate requirements clusters, based on user input. Additionally, or alternatively, client device 210 may determine one or more default clustering techniques to perform. In some implementations, client device 210 may determine the clustering technique(s) based on a characteristic of the text (e.g., a size of the text, contents included in the text, a quantity of requirements in the text, a quantity of terms in the text, a file format of a file that includes the text, etc.).

A clustering technique may include hierarchical agglomerative clustering, requirement clustering around theme sets, weighted connected component based clustering, or the like. Except as otherwise noted below, client device 210 may perform a single analysis technique, or may perform any combination of multiple analysis techniques. When performing a combination of multiple analysis techniques, client device 210 may perform the multiple analysis techniques in any order, except as otherwise noted below.

As further shown in FIG. 7, process 700 may include performing hierarchical agglomerative clustering (block 740). For example, client device 210 may perform hierarchal agglomerative clustering of one or more theme sets, included in the list of theme sets, based on sorting clusters by clustering similarity. Client device 210 may generate clusters using hierarchical clustering by determining similarity measurements associated with requirements, determining similarity measurements associated with clusters of requirements, iteratively agglomerating clusters, and associating theme sets with clusters.

As an example, client device 210 may generate a semantic similarity matrix TR of size d×n (e.g., with d rows and n columns), where d is equal to the number of requirements in the list of unique requirements (e.g., where unique requirement list D=[$Req_1$, $Req_2$, ..., $Req_d$]), and where n is equal to the number of theme sets in the list of theme sets (e.g., where theme set list L=[$T_1$, $T_2$, ..., $T_a$]). The semantic similarity matrix TR may store an indication of the cosine similarity between a theme and a requirement.

In some implementations, client device 210 may convert a theme cluster into a pseudo requirement vector (e.g., a column in co-occurrence matrix C), and may determine an inverse document frequency for terms in the text based on the pseudo requirement vector. A pseudo requirement vector may refer to a pseudo-vector of a requirement cluster. For example, client device 210 may generate an array Q of size t (e.g., with t elements), where t is equal to the number of terms in the list of terms (e.g., where the list of terms TermList=[$term_1$, $term_2$, ... $term_t$]). A data structure (e.g., an array Q) may store an indication of the inverse document frequency for each term. For example, a value stored in Q[l] may equal the inverse document frequency of terms (e.g., Q[l]=$IDF_1$).

In some implementations, client device 210 may determine semantic similarity matrix TR based on truncated matrix V. For example, client device 210 may map Q onto latent semantic index space as follows:

$$[Q_{new}]_{1 \times k} = [Q]_{1 \times t}[U]_{t \times k}[\Sigma_{k \times k}]^{-1},$$

where $Q_{new}$ represents a matrix storing Q mapped onto latent semantic space, Q represents a matrix storing indications of the inverse document frequency for terms in the text, U represents a unitary matrix, and $[\Sigma_{k \times k}]^{-1}$ represents a matrix inverse of the singular value decomposition of C with the first k×k terms selected.

In some implementations, when client device 210 is to use latent semantic indexing, client device 210 may calculate the semantic similarity of $Q_{new}$ (e.g., Q mapped onto the latent semantic space) based on requirement vectors of truncated matrix V as TR[i,r]=Cosine($Q_{new}$, V[i], k). In some implementations, when client device 210 is not to use latent semantic indexing, client device 210 may calculate the semantic similarity of $Q_{new}$ with the requirement vectors of co-occurrence matrix C (e.g., the transpose of co-occurrence matrix C) as TR[i,r]=Cosine($Q_{new}$, $C^T$[i], t).

Client device 210 may calculate total clustering similarity for each pair of requirements based on the combined similarity score ComSim and the semantic similarity score TR. For example, client device 210 may determine a set of weighting parameters (e.g., $\delta_1$, $\delta_2$, ..., $\delta_{n+1}$, of size n+1, where n is equal to the quantity of theme clusters). Client device 210 may calculate the total clustering similarity as follows:

$$TotalSim[i,j] = \alpha_1 ComSim[i,j] + (\Sigma_{k=1}^{k=n+1} \delta_k TR_k[i,j])$$

where TotalSim represents a matrix storing an indication of the total clustering similarity score for each pair of requirements, $\alpha_1$ represents a weighting parameter, ComSim represents a matrix storing an indication of the combined similarity score for each pair of requirements (e.g., based on SemSim and PlaceSim), $\delta_k$ represents a weighting parameter associated with the semantic similarity matrix TR, and TR represents a matrix storing an indication of the semantic similarity between a requirement and a theme cluster.

In some implementations, client device 210 may perform agglomerative hierarchical clustering based on the total clustering similarity score. For example, client device 210 may perform hierarchical agglomerative clustering by determining the centroid similarity for each pair of clusters based on the total clustering similarity, sorting the pairs of clusters based on an associated centroid similarity, merging the sorted pairs of clusters based on a merging parameter, and providing merged clusters based on a cluster level.

Client device 210 may determine centroid similarity for each pair of requirement clusters, in some implementations. For example, client device 210 may generate a set of requirement clusters $C_1, C_2, \ldots, C_d$ corresponding to respective requirements $Req_1, Req_2, \ldots, Req_d$. Client device 210 may calculate an average similarity (e.g., the centroid similarity) for each pair of requirement clusters ($C_i$, $C_j$) as follows:

$$CenSim[i, j] = \frac{\sum_{Req_{l1} \in C_i \text{ AND } Req_{l2} \in C_j} TotalSim[l1, l2]}{|C_i| * |C_j|}$$

where CenSim represents a matrix storing an indication of the centroid similarity score for pairs of requirement clusters, $Req_{l1}$ represents a requirement of cluster $C_i$, $Req_{l2}$ represents a requirement of cluster $C_j$, TotalSim represents a matrix storing an indication of the total similarity score for a pair of requirements, C, represents a first requirement cluster, and $C_j$ represents a second requirement cluster.

Client device 210 may generate a set of sorted list cluster pairs, θ, and may populate θ based on the centroid similarity associated with the cluster pairs. Client device 210 may generate a parameter $CenSim_{max}$ that stores an indication of the highest centroid similarity among the cluster pairs (e.g., such that $CenSim_{max} = \theta[1] = \max\{CenSim\}$). In some implementations, client device 210 may define a parameter, Δ, associated with performing hierarchical agglomerative clustering. For example, client device 210 may determine to provide clusters based on determining that $CenSim_{max} < \Delta$. Additionally, or alternatively, when $CenSim_{max} \geq \Delta$, client device 210 may merge top cluster pairs.

Client device 210 may, for one or more cluster levels, merge top cluster pairs (e.g., requirement cluster pairs) by determining a parameter associated with a quantity of top cluster pairs to be merged, ω, based on a total quantity of cluster pairs in θ (e.g., represented by φ) and a clustering parameter (e.g., represented by κ). For example, client device 210 may determine the quantity of top cluster pairs to be merged at a cluster level as $\omega = \phi \times \kappa / 100$. A cluster level may refer to a quantity of iterations with which the set of requirement cluster pairs, θ, has been merged. For example, client device 210 may determine a centroid similarity score for a set of clusters, may determine that $CenSim_{max} \geq \Delta$, may determine to merge a quantity of top cluster pairs based on w, may associate current clusters (e.g., the merged top clusters and the non-merged remaining clusters) with a cluster level, and may determine centroid similarity scores for the current set of clusters. In some implementations, client device 210 may merge top cluster pairs iteratively (e.g., may increment the cluster level, may calculate centroid similarity scores to determine top cluster pairs, and may merge another w top cluster pairs until $CenSim_{max} < \Delta$).

In some implementations, client device 210 may determine one or more theme sets that are closely associated with one or more agglomerated requirement clusters based on information content analysis. For example, client device 210 may perform information content analysis by determining the average similarity between each requirement cluster and each theme set, and by determining a quantity of themes to be associated with each requirement cluster.

Client device 210 may determine the average similarity between each requirement cluster and each theme set. For example, the average similarity for a particular requirement cluster with each theme set may be calculated as follows:

$$\pi_{kr} = \frac{\sum_{\forall Req_i \in C_k} TR[i, r]}{|C_k|}$$

where $\pi_{kr}$ represents a set of indicators of the average similarity of the particular requirement cluster with each theme set, $Req_i$ represents a requirement associated with the particular requirement cluster, TR represents a matrix storing indicators of the semantic similarity between requirements and theme clusters, and $C_k$ represents an indicator of the particular requirement cluster. The average similarity may be calculated for all requirement clusters with each theme set to generate a set of average similarity scores. Client device 210 may sort theme sets (e.g., a list of theme sets L) based on the average similarity score, $\pi_{kr}$.

Client device 210 may determine a range of quantities of theme sets to be associated with each requirement cluster. For example, client device 210 may determine a minimum quantity of theme sets based on a user input. Additionally, or alternatively, client device 210 may determine a maximum quantity of theme sets based on the total quantity of theme sets in the set of theme sets (e.g., based on the size of L). In some implementations, client device 210 may determine the quantity of theme sets to be associated with each requirement cluster based on the range of quantities of theme sets. For example, client device 210 may determine the quantity of theme sets to be associated with each requirement cluster to be the minimum quantity of theme sets. Additionally, or alternatively, client device 210 may determine the quantity of theme sets to be associated with each requirement cluster based on a quantity parameter, $N_k$, associated with the maximum quantity of theme sets. Client device 210 may calculate a term frequency-inverse document frequency (tf-idf) parameter, TotalInfo, associated with determining the quantity parameter as follows:

$$Info(Req_i) = \sum_{k=1}^{t} C[i][k]$$

$$TotalInfo = \sum_{i=1}^{d} Info(Req_i),$$

where Info represents the summation of tf-idf values for each term occurring in a particular requirement (e.g., a total information content of the particular requirement), $Req_i$ represents an indicator of the particular requirement, C represents a matrix storing indications of tf-idf values, and TotalInfo represents a summation of the values of Info for each term occurring in each requirement (e.g., the total information content of all requirements of the text).

Client device 210 may determine the quantity parameter, $N_k$, based on the tf-idf parameter. For example:

$$Info[C_k] = \sum_{Req_i \in C_k} Info(Req_i)$$

$$N_k = Max * \left[\frac{Info(C)}{TotalInfo}\right]$$

where Info[ ] represents a matrix storing the summation of tf-idf parameters associated with requirements of a particular requirement cluster, $C_k$ represents an indication of the particular requirement cluster, $Info(Req_i)$ represents the summation of tf-idf values for each term occurring in a requirement of the particular requirement cluster, $N_k$ represents a quantity parameter, Max represents a maximum quantity of theme sets that may be associated with the particular requirement cluster, Info(C) is a particular value from Info[ ] associated with the particular requirement cluster, and TotalInfo is the tf-idf parameter.

Client device 210 may determine the quantity of themes to be associated with a particular cluster based on the quantity parameter, in some implementations. For example, when the quantity parameter, $N_k$, is greater than the minimum quantity of theme sets that may be associated with the particular cluster, client device 210 may determine to associate $N_k$ theme sets with the particular cluster. Additionally, or alternatively, when the quantity parameter is less than or equal to the minimum quantity of theme sets that may be associated with the particular cluster, client device 210 may determine to associate the minimum quantity of theme sets with the particular cluster.

As further shown in FIG. 7, process 700 may include performing clustering around theme sets (block 750). For example, client device 210 may perform requirement clustering around theme sets by determining a semantic similarity for each pair of requirements and theme sets; by assigning requirements, which have a highest similarity with a particular theme set as compared to other theme sets, to a group associated with the particular theme set; by assigning a particular requirement, with which a theme set has a highest similarity as compared to other requirements, to a group associated with the theme set; and by performing hierarchical clustering with each group of requirements based on a combined similarity determination, as discussed herein in connection with block 740.

Client device 210 may assign a particular requirement to multiple groups of theme sets (e.g., that are associated with different theme sets), in some implementations. For example, client device 210 may determine that a first requirement has a highest semantic similarity score with a first theme set, and may assign the first requirement to a group that is associated with the first theme set, and client device 210 may determine that a second theme set has a highest semantic similarity score with the first requirement (e.g., although the second theme set may have a lower semantic similarity score than the first theme set), and may assign the first requirement to another group that is associated with the second theme set.

As further shown in FIG. 7, process 700 may include performing weighted connected component based clustering (block 760). For example, client device 210 may iteratively perform weighted connected component based clustering by assigning each requirement to a different cluster, by calculating a centroid similarity for each pair of clusters, by sorting each pair of clusters based on the centroid similarity, and by merging clusters based on one or more merge parameters.

Client device 210 may determine centroid similarity based on a combined similarity. For example:

$$CenSim[i, j] = \frac{\sum_{u \in C_i \wedge u' \in C_j} ComSim[u, u']}{|C_i| * |C_j|}$$

where CenSim represents the centroid similarity for a particular pair of clusters (e.g., that include one or more requirements), ComSim represents the combined similarity for the particular pair of clusters, $C_i$ represents a first cluster of the particular pair of clusters, and $C_j$ represents a second cluster of the particular pair of clusters. Client device 210 may sort pairs of clusters based on the centroid similarity score. For example, client device 210 may generate a sorted set of cluster pairs, θ.

Client device 210 may merge clusters based on one or more merge parameters, in some implementations. For example, client device 210 may determine a first merge parameter (e.g., a first merge threshold, conTh) associated with a particular pair of clusters that are to be merged (e.g., where conTh may be provided a particular value, such as a user provided value, a value provided by server device 220, or the like). In this case, client device 210 may merge the particular pair of clusters (e.g., $(C_l, C_m)$) based on determining that a centroid similarity score associated with the particular pair of clusters (e.g., CenSim[l,m] associated with cluster pair $(C_l, C_m)$) satisfies the first merge threshold.

Additionally, or alternatively, client device 210 may determine a second merge parameter (e.g., a second merge threshold, Δ) associated with a cluster pair that has a highest centroid similarity score (e.g., θ[1]=$(C_i, C_j)$=max{θ[ ]}, where θ stores cluster pairs ordered based on centroid similarity). In this case, client device 210 may determine to merge a particular pair of clusters, $(C_l, C_m)$, based on determining that the centroid similarity score for the cluster pair that has the highest centroid similarity score satisfies the second merge parameter (e.g., CenSim[i,j]>Δ for cluster pair $(C_i, C_j)$).

In some implementations, client device 210 may merge clusters iteratively. For example, when client device 210 determines to merge cluster pairs, client device 210 may determine new centroid similarity scores for the set of clusters, including the merged cluster pairs, may sort the set of clusters based on the new centroid similarity scores, and may determine to merge clusters based on the new centroid similarity scores and the one or more merge parameters. In some implementations, client device 210 may determine not to further merge clusters. For example, when client device 210 determines that the first merge parameter or the second merge parameter are not satisfied, client device 210 may cease merging clusters.

As further shown in FIG. 7, process 700 may include providing information associated with generated requirement clusters based on performing clustering (block 770). For example, client device 210 may determine information associated with the requirement clusters, and may provide the determined information. In some implementations, providing the information may include providing an indication of a central requirement for each requirement cluster of the merged clusters. For example, client device 210 may determine the central requirement to be a requirement associated with a requirement cluster that has the highest average similarity score with the other requirements associated with the requirement cluster. In this case, client device 210 may provide the central requirement for each requirement cluster when providing the requirement clusters.

Client device 210 may associate top related theme sets with clusters of a particular cluster level, and may provide the clusters and associated theme sets for display, in some implementations. For example, when client device 210 generates multiple cluster levels, client device 210 may determine a median cluster level (e.g., MedianLevel=ceiling{ClusterLevel/2}, where ceiling represents a ceiling function), and may display clusters and associated theme sets from the median cluster level.

In this way, client device 210 may generate one or more requirement clusters based on a text and associated with one or more theme sets, thereby facilitating requirements analysis of the text. In this way, a user may be able to view requirements that are closely related.

Although FIG. 7 shows example blocks of process 700, in some implementations, process 700 may include additional blocks, different blocks, fewer blocks, or differently arranged blocks than those depicted in FIG. 7. Additionally, or alternatively, two or more of the blocks of process 700 may be performed in parallel.

Figure 8A:
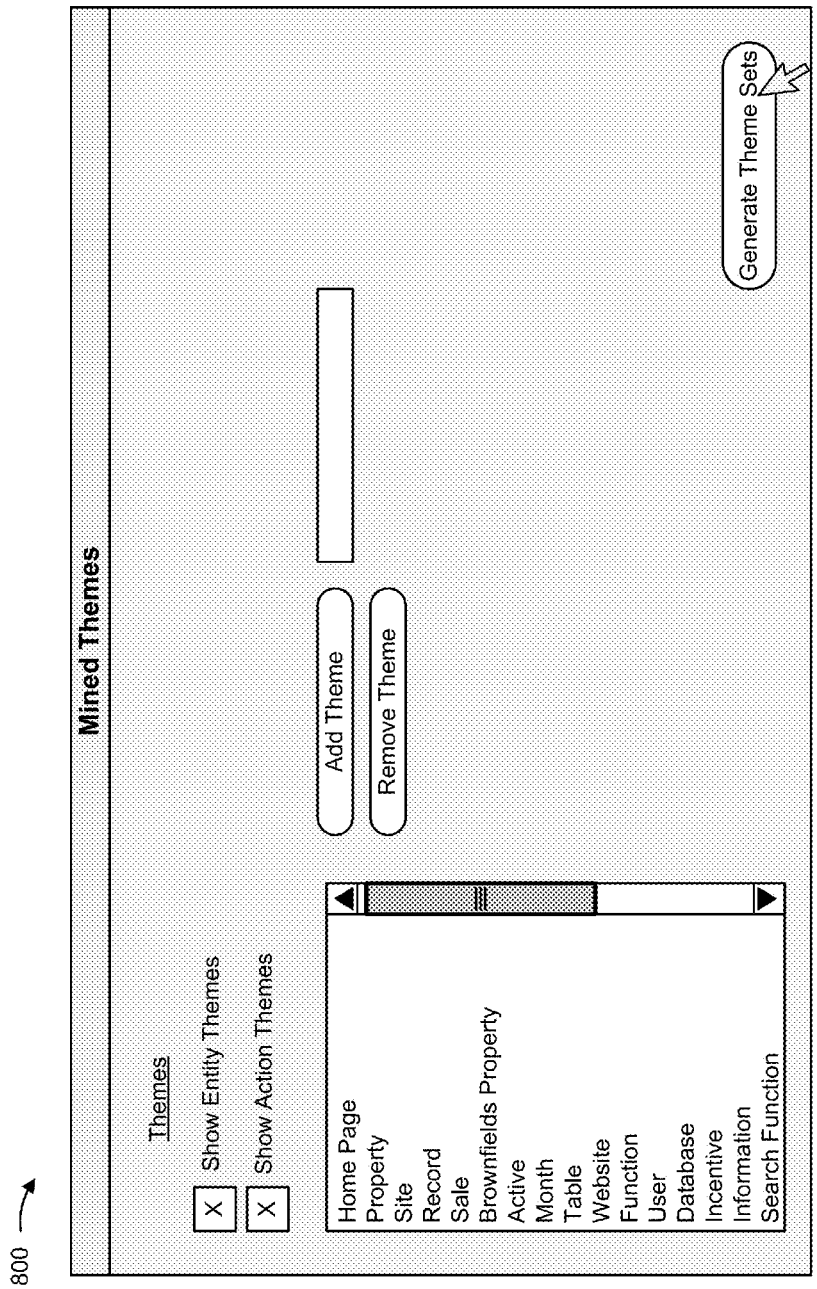

FIGS. 8A-8I are diagrams of an example implementation 800 relating to process 400 shown in FIG. 4. As shown in FIG. 8A, assume that a user has selected a text document to mine for themes, and that client device 210 has processed the text document to determine commonly-occurring themes. Assume that client device 210 has calculated one or more similarity measurements between terms included in the text to identify the themes (e.g., Home Page, Property, Site, Record, Sale, etc., as shown), and has provided the themes via a user interface. As further shown in FIG. 8A, a user may provide input to client device 210 to select a type of theme to by displayed and/or further processed (e.g., entity themes, action themes, etc.), may provide input to add a particular theme (e.g., a term from the document) to the list of themes, or may provide input to remove a particular theme from the list of themes. Further, assume that the user interacts with the user interface to indicate that client device 210 is to generate theme sets from the displayed list of themes (e.g., to group themes into theme sets of themes that are related according to a similarity measurement).

Figure 8B:
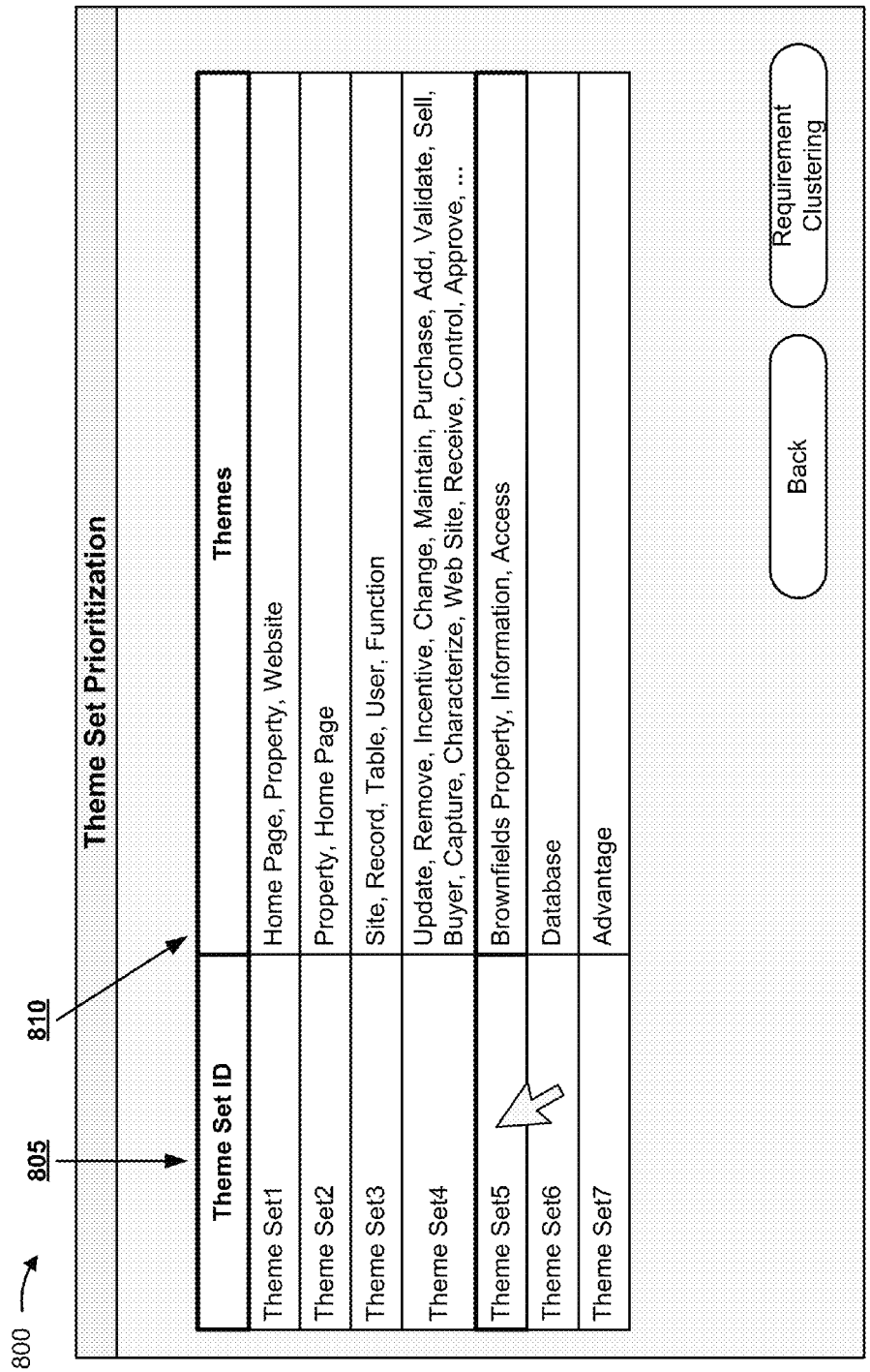

As shown in FIG. 8B, client device 210 may use one or more similarity measurement techniques to generate a list of prioritized theme sets. The theme sets may be displayed in an order of descending priority, with a higher priority (e.g., theme set 1) indicating that themes in the theme set have a high similarity (e.g., a higher likelihood of being related than a lower priority theme set), and a lower priority (e.g., theme set 7) indicating that themes in the theme set have a low similarity (e.g., a lower likelihood of being related than a higher priority theme set). As shown by reference number 805, each theme set may be identified using a theme set identifier, and the identifier may indicate a priority associated with the theme set (e.g., theme set 1 may have a higher priority than theme set 2). As shown by reference number 810, client device 210 may provide a list of themes included in each theme set (e.g., from the list of themes displayed in FIG. 8B). As further shown in FIG. 8B, assume that a user interacts with the user interface to select theme set 5, and to indicate that theme set 5 is to receive the highest priority.

Figure 8C:
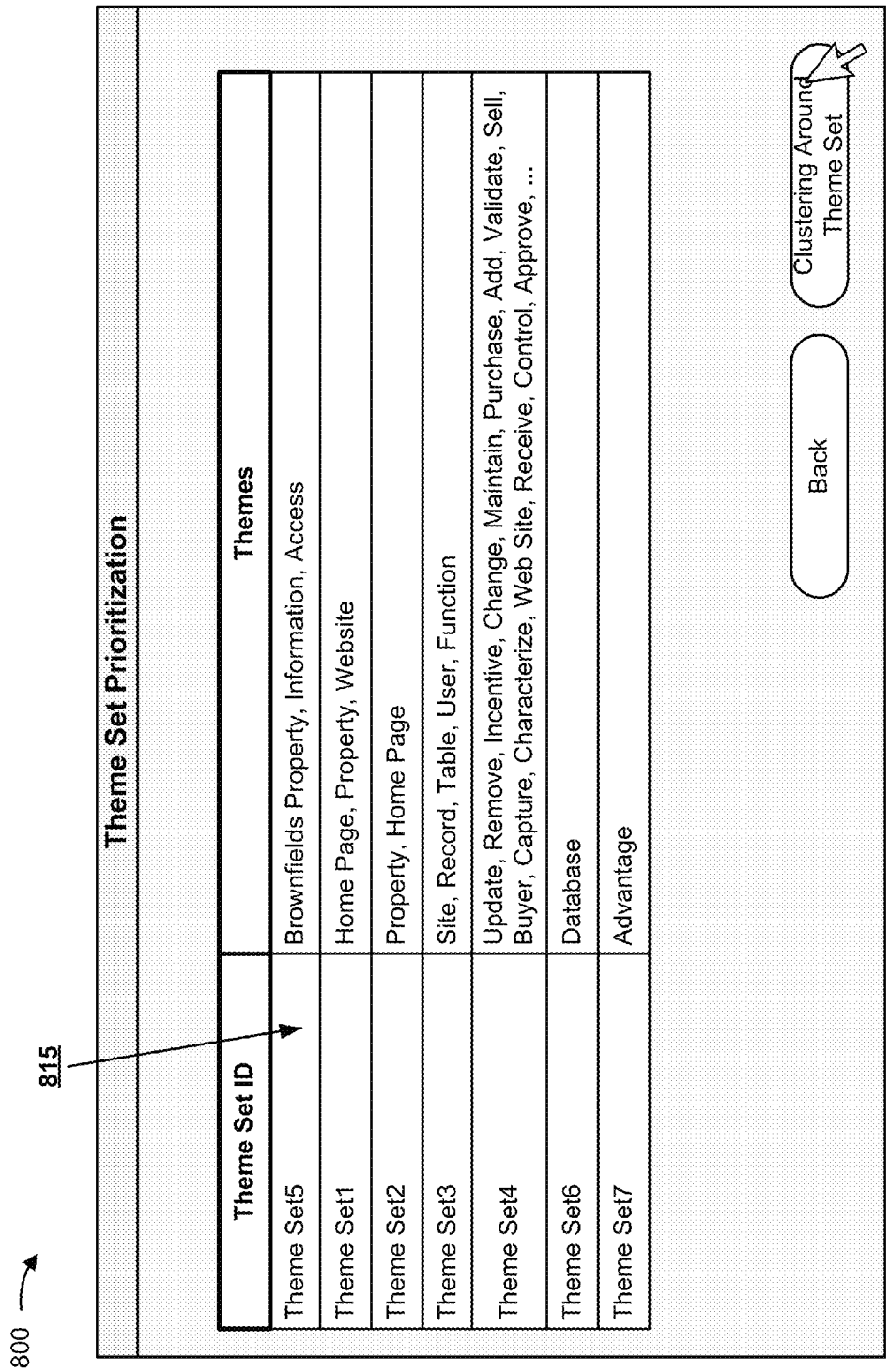

As shown in FIG. 8C, based on the user interaction, client device 210 has increased a priority of theme set 5, and has moved theme set 5 to the top of the list, as shown by reference number 815. Assume that client device 210 provides the theme sets on the user interface from top to bottom in order of descending priority. Thus, theme sets at the top of the list have a higher similarity score among themes included in the theme set than theme sets at the bottom of the list. As further shown in FIG. 8C, assume that the user interacts with the user interface to indicate that client device 210 is to cluster requirements around theme sets.

As shown in FIG. 8D, client device 210 may use one or more similarity measurement techniques described herein to generate a list of requirement clusters (e.g., one or more requirements) associated with a particular theme set. As shown by reference numbers 820 and 825, theme sets may be identified using a theme set identifier and/or a list of themes may be identified that are included in the theme set. As shown by reference number 830, one or more requirements associated with each theme set may be identified via the user interface. For example, theme set 5, which includes the themes Brownfields Property, Information, and Access, is associated with requirement 31 (e.g., requirement 31 may include one or more of these themes/terms). As shown, a theme set may be associated with a single requirement or multiple requirements. For example, theme set 2 is associated with requirements 13, 11, 16, 19, 21, and 32. The requirements may be listed in order of most similarity (e.g., highest similarity score) to the theme set, to least similarity to the theme set (or vice versa). As further shown in FIG. 8D, assume that the user interacts with the user interface to indicate that client device 210 is to separate clusters into a finer granularity (e.g., a "next level" of clustering).

As shown in FIG. 8E, based on the user interaction, client device 210 may split requirements in one or more requirement clusters into two clusters (e.g., based on moving to level two clustering, or the "next level" of clustering). For example, client device 210 may split requirements associated with theme set 2 into two clusters, where the first cluster include requirements 13 and 11, and the second cluster includes requirements 16, 19, 21, and 32. The clusters may be split according to a threshold, where requirements that satisfy the threshold (e.g., are greater than or equal to the threshold) are placed into a first cluster, and requirements that do not satisfy the threshold (e.g., are less than the threshold) are placed into a second cluster. As shown by reference number 835, client device 210 may provide an indication of the separate clusters, such as by using a string of one or more characters (e.g., *), to separate the clusters on the user interface. The user may interact with the user interface to group the separated clusters into clusters of even finer granularity (e.g., a "next level" of level 3, where the original clusters from FIG. 8D may be split into three clusters) or to group the requirements into clusters of coarser granularity (e.g., a "previous" level of level 1, where the original clusters from FIG. 8D are restored). As further shown in FIG. 8E, assume that the user interacts with the user interface to indicate that client device 210** is to provide an indication of requirement clusters determined based on weighted connected component based clustering.

Figure 8F:
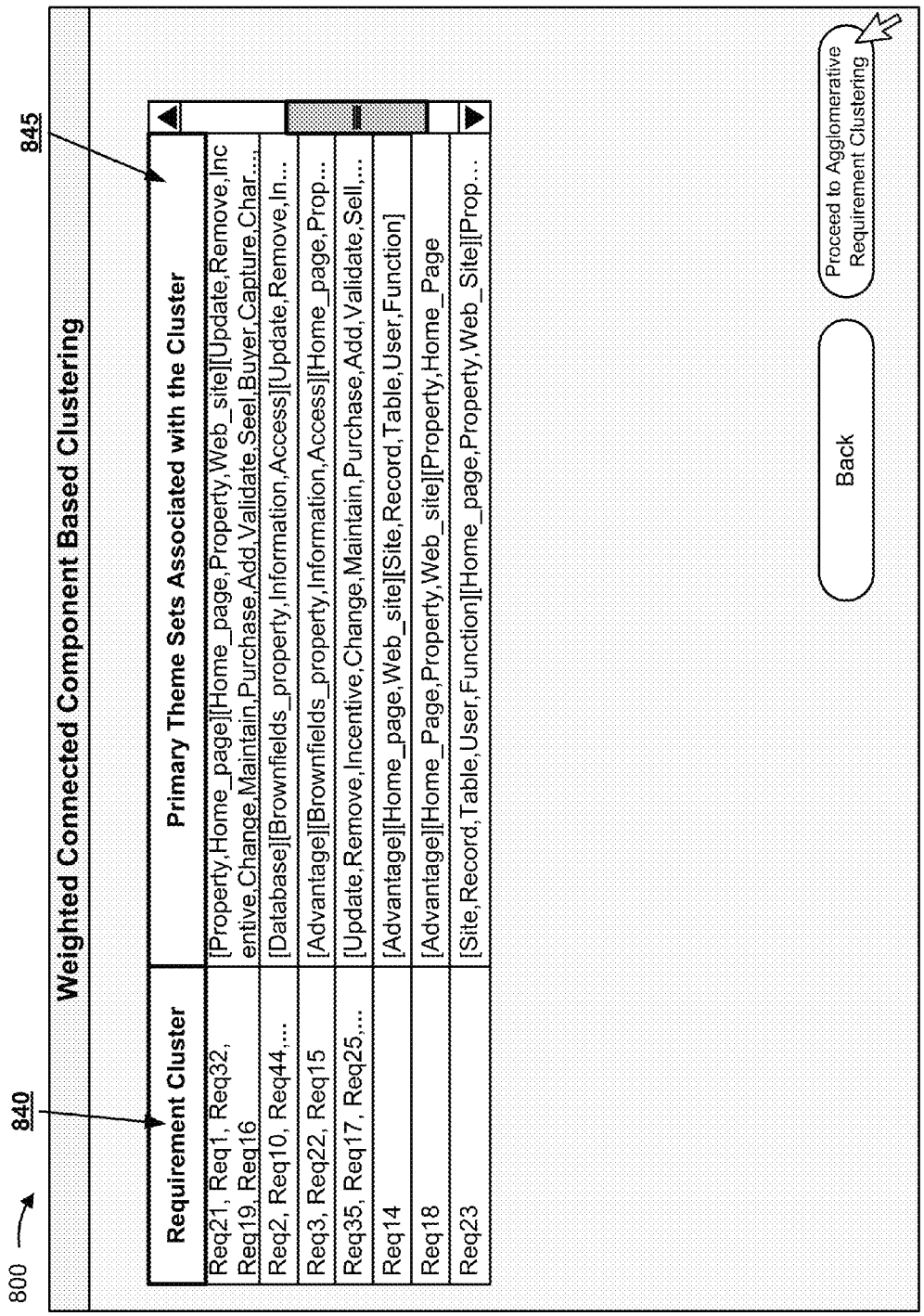

As shown in FIG. 8F, based on the user interaction, client device 210 may use one or more similarity measurement techniques described herein to generate a list of requirement clusters. Based on determining theme sets of related themes, client device 210 may generate requirement clusters of related requirements (e.g., that relate to the same theme set, that include terms in the same theme set, etc.). As shown by reference number 840, client device 210 may identify requirements included in each requirement cluster. Assume that the requirement clusters are provided in descending order from highest average similarity score to lowest average similarity score among requirements included in the cluster. As shown by reference number 845, client device 210 may provide an indication of one or more theme sets associated with each requirement cluster. The theme sets may be identified using a theme set identifier, or by identifying the themes included in each theme set. The theme sets may be listed in order of highest association (e.g., highest similarity score) with a requirement cluster, to lowest association with the requirement cluster (or vice versa). As further shown in FIG. 8F, assume that the user interacts with the user interface to indicate that client device 210 is to provide an indication of requirement clusters based on hierarchical agglomerative clustering.

Figure 8G:
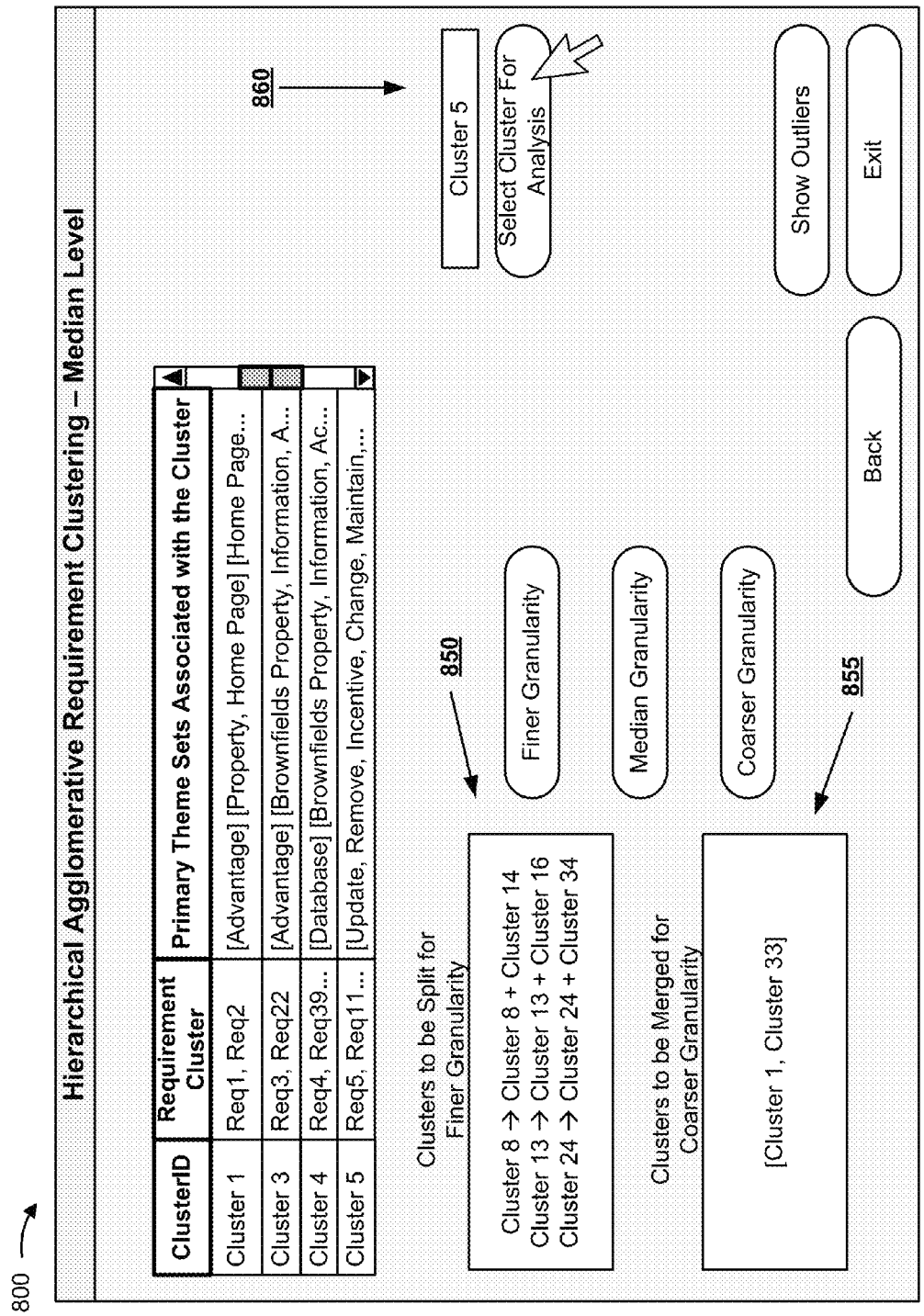

As shown in FIG. 8G, assume that the user interaction causes client device 210 to provide a list of requirement clusters and associated theme sets, similar to FIG. 8F. As shown, client device 210 may provide one or more input mechanisms for causing client device 210 to display the requirement clusters using different levels of granularity. For example, the user may select to display the requirement clusters using a finer level of granularity. As shown by reference number 850, client device 210 may provide an indication of which clusters will be split when the user selects the finer granularity level. As another example, the user may select to display the requirement clusters using a coarser level of granularity. As shown by reference number 855, client device 210 may provide an indication of which clusters will be merged when the user selects the finer granularity level. In some implementations, the user may select a median level of granularity (e.g., default level that uses a default threshold for clustering). A user selection that adjusts the granularity may cause client device 210 to adjust the displayed clusters. As shown by reference number 860, assume that the user interacts with the user interface to select a cluster, and to indicate that client device 210 is to provide further details regarding the cluster (e.g., similarity scores calculated for the cluster).

Figure 8H:
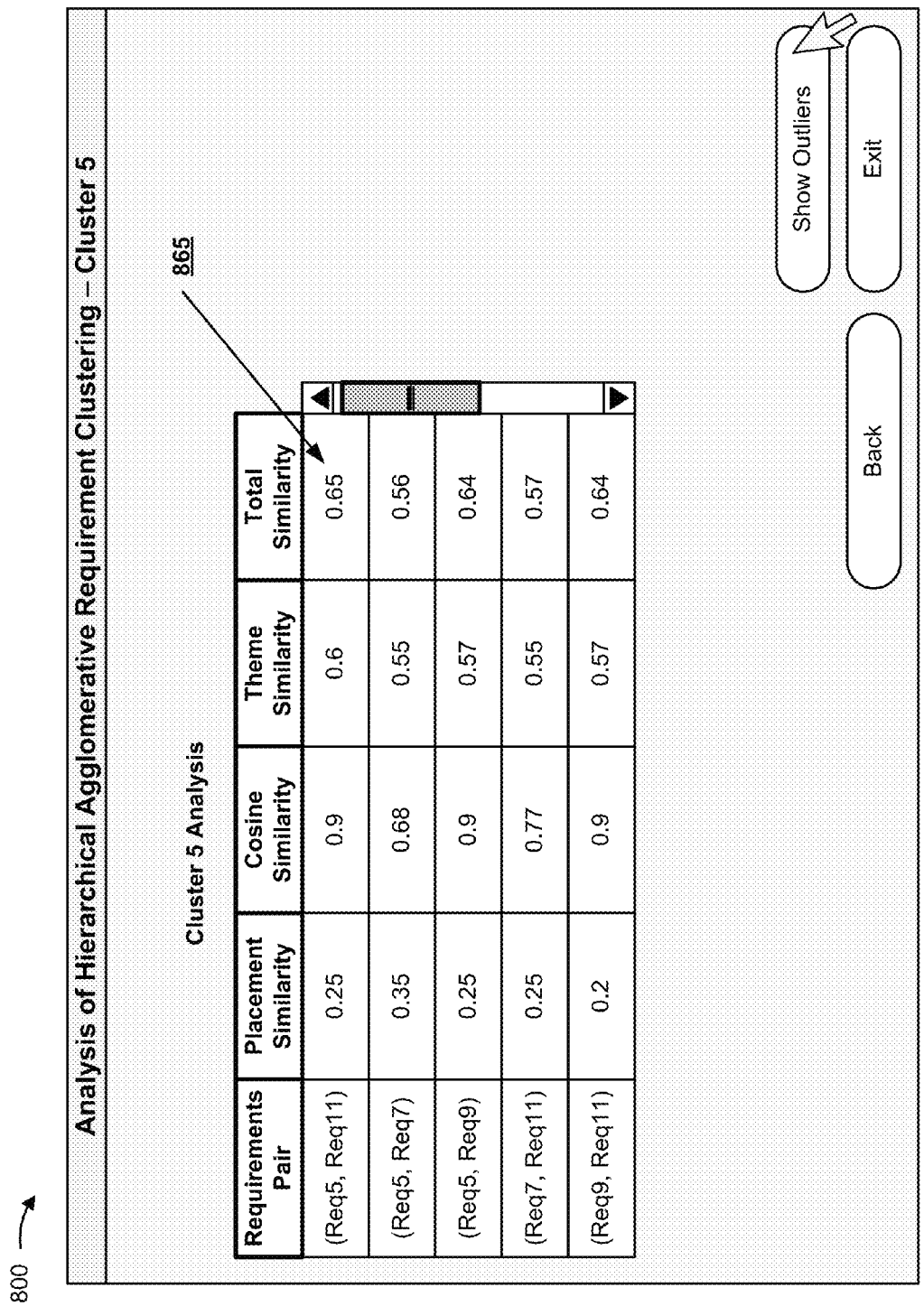

As shown in FIG. 8H, the user interaction may cause client device 210 to provide a user interface that displays similarity scores for requirement pairs included in a particular cluster (e.g., cluster 5, as shown). As shown by reference number 865, the similarity scores may include a placement similarity score, a cosine similarity score, a theme similarity score, and/or a total similarity score. As further shown in FIG. 8H, assume that the user interacts with the user interface to indicate that client device 210 is to provide information associated with outlier requirements.

Figure 8I:
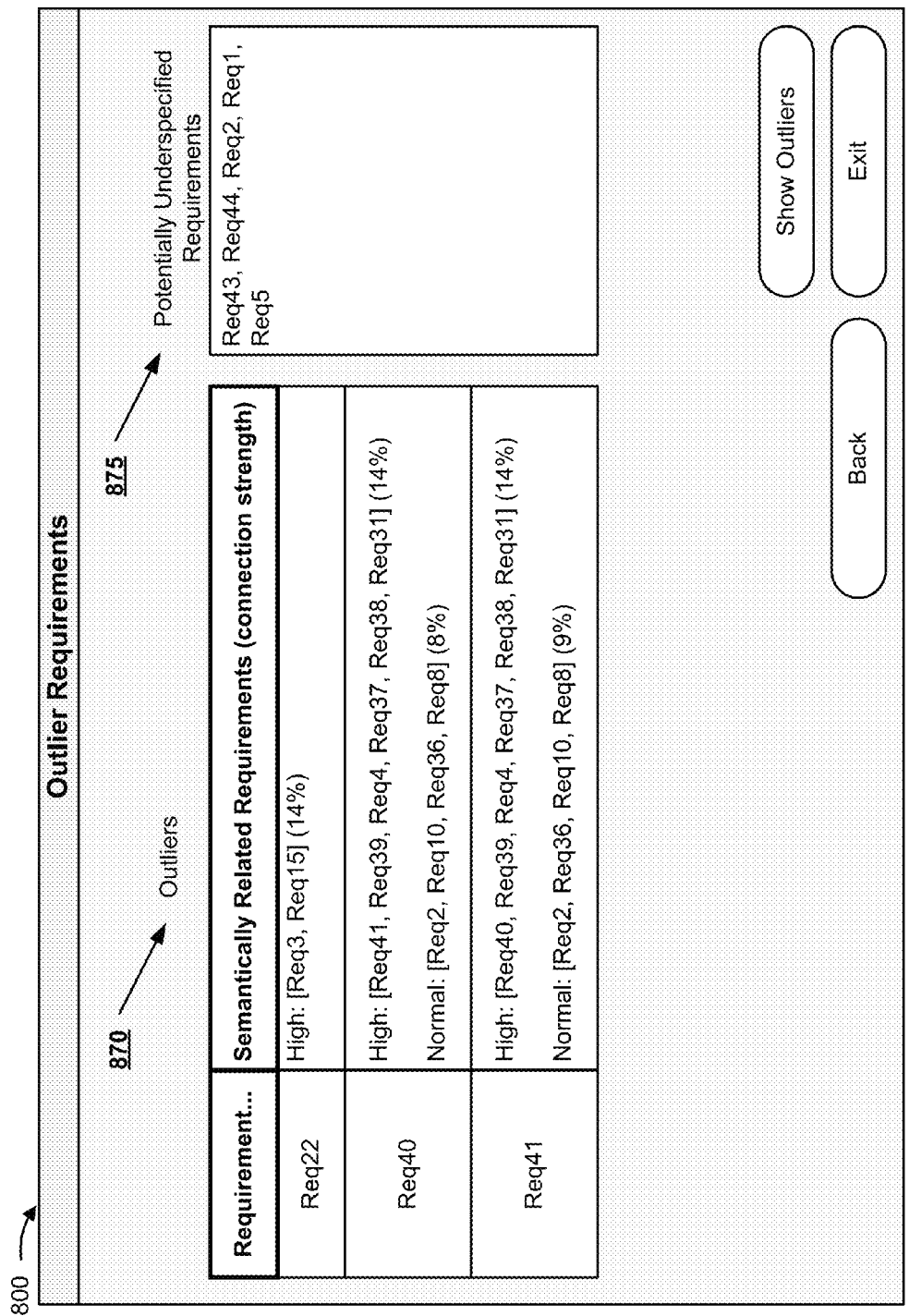

As shown in FIG. 8I, assume that the user interaction causes client device 210 to display outlier requirements. As shown by reference number 870, client device 210 may identify the outlier requirements based on one or more similarity measurement techniques described herein. For example, client device 210 may identify that requirement 22 is an outlier because requirement 22 only has a 14% similarity score with other requirements (e.g., which may be below an outlier threshold). As shown by reference number 875, client device 210 may identify requirements with very low similarity scores (e.g., below a second outlier threshold) as potentially underspecified requirements. This information may indicate that a user should further define the outlier requirements in the requirements document.

As indicated above, FIGS. 8A-8I are provided merely as an example. Other examples are possible and may differ from what was described with regard to FIGS. 8A-8I.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors, implemented at least partially in hardware, to:
   receive information that identifies a document to be analyzed,
      the document including text;
   analyze the document to identify a set of requirements to be analyzed,
      the set of requirements identifying desired properties relating to a web site;
   analyze the document to identify a set of themes to be analyzed,
      the set of themes identifying concepts to which terms in the text are related;
   perform a similarity analysis to determine a similarity score between each theme, included in the set of themes, and each requirement, included in the set of requirements;
   determine a set of dominant themes based on performing the performed similarity analysis, the set of dominant themes including at least one theme, included
in the set of themes, with a higher similarity score than at least one other
theme included in the set of themes; and
provide information that identifies the set of dominant themes.

2. The device of claim 1, where the one or more processors are further to:
calculate a theme similarity score between a pair of themes included in the set of dominant themes;
determine that the theme similarity score, for the pair of themes, satisfies a first threshold;
merge the pair of themes to form a theme cluster based on determining that the theme similarity score, for the pair of themes, satisfying the first threshold; and
provide information that identifies the theme cluster.

3. The device of claim 2, where the one or more processors are further to:
calculate a requirement similarity score between a pair of requirements included in the set of requirements;
determine that the requirement similarity score, for the pair of requirements, satisfies a second threshold;
merge the pair of requirements to form a requirement cluster based on the requirement similarity score, for the pair of requirements, satisfying the second threshold; and
provide information that identifies the requirement cluster.

4. The device of claim 3, where the one or more processors, when calculating the requirement similarity score between the pair of requirements, are to calculate the requirement similarity score based on at least one of:
a semantic similarity score between the pair of requirements,
a placement similarity score between the pair of requirements, or
the semantic similarity score and the placement similarity score.

5. The device of claim 3, where the one or more processors are further to:
calculate an average similarity score between themes included in the theme cluster and requirements included in the requirement cluster;
determine that the average similarity score satisfies a third threshold; and
provide an indication that the theme cluster and the requirement cluster are related based on determining that the average similarity score satisfying the third threshold.

6. The device of claim 5, where the one or more processors, when calculating the average similarity score between the themes included in the theme cluster and the requirements included in the requirement cluster, are to:
calculate the average similar score based on a centroid similarity score between the themes and the requirements.

7. The device of claim 1, where the one or more processors are further to:
receive input indicating that a first subset of dominant themes, included in the set of dominant themes, is of higher importance than a second subset of dominant themes, included in the set of dominant themes;
modify a similarity value associated with the first subset of dominant themes to indicate that the first subset of dominant themes is of higher importance than the second subset of dominant themes based on receiving the received input; and
provide an indication that the first subset of dominant themes is of higher importance than the second subset of dominant themes based on modifying the modified similarity value.

8. A method, comprising:
analyzing, by a device, text to identify a set of text portions of interest,
the set of text portions being requirements that identify desired properties relating to a web site;
analyzing, by the device, the text to identify a set of terms included in the set of text portions;
performing, by the device, a similarity analysis to determine a degree of similarity between each term, included in the set of terms, and each text portion, included in the set of text portions;
determining, by the device, a set of dominant terms based on performing the performed similarity analysis,
the set of dominant terms including at least one term, included in the set of terms, with a higher degree of similarity than at least one other term included in the set of terms; and
providing, by the device, information that identifies the set of dominant terms.

9. The method of claim 8, further comprising:
calculating a term similarity score between a pair of terms included in the set of dominant terms;
determining that the term similarity score, for the pair of terms, satisfies a first threshold;
merging the pair of terms to form a term cluster based on the term similarity score, for the pair of terms, satisfying the first threshold; and
providing information that identifies the term cluster.

10. The method of claim 9, further comprising:
calculating a text portion similarity score between a pair of text portions included in the set of text portions;
determining that the text portion similarity score, for the pair of text portions, satisfies a second threshold;
merging the pair of text portions to form a text portion cluster based on determining that the text portion similarity score, for the pair of text portions, satisfying the second threshold; and
providing information that identifies the text portion cluster.

11. The method of claim 10, where the calculating the text portion similarity score between the pair of text portions includes at least one of:
calculating the text portion similarity score using a semantic similarity score between the pair of text portions,
calculating the text portion similarity score using a placement similarity score between the pair of text portions, or
calculating the text portion similarity score using the semantic similarity score and the placement similarity score.

12. The method of claim 10, further comprising:
calculating an average similarity score between terms included in the term cluster and text portions included in the text portion cluster;
determining that the average similarity score satisfies a third threshold; and
providing an indication that the term cluster and the text portion cluster are related based on determining that the average similarity score satisfying the third threshold.

13. The method of claim 12, further comprising:
modifying the third threshold; and
providing, based on modifying the modified third threshold, at least one of:
- an indication that the term cluster and the text portion are no longer related, or
- an indication that the term cluster and an additional text portion, included in the set of text portions, are related.

14. The method of claim 10, further comprising:
calculating an average similarity score between terms included in the term cluster and text portions included in the text portion cluster;
determining that the average similarity score satisfies an outlier threshold; and
providing an indication that the text portion cluster includes at least one outlier text portion based on that the average similarity score satisfying the outlier threshold.

15. The method of claim 8, further comprising:
receiving input indicating that a first subset of dominant terms, included in the set of dominant terms, is of higher importance than a second subset of dominant terms, included in the set of dominant terms;
modifying a similarity value associated with the first subset of dominant terms to indicate that the first subset of dominant terms is of higher importance than the second subset of dominant terms based on receiving the received input; and
providing an indication that the first subset of dominant terms is of higher importance than the second subset of dominant terms based on modifying the modified similarity value.

16. A non-transitory computer-readable medium storing instructions, the instructions comprising:
one or more instructions that, when executed by one or more processors, cause the one or more processors to:
- identify a set of requirements in a document to be analyzed, the document including text, and the set of requirements identifying desired properties relating to a web site;
- identify a set of terms in the document to be analyzed;
- perform a similarity analysis to determine a similarity measurement between each term, included in the set of terms, and each requirement, included in the set of requirements;
- determine a set of dominant terms based on performing the performed similarity analysis, the set of dominant terms including at least one term, included in the set of terms, with a higher similarity measurement than at least one other term included in the set of terms; and
- provide information that identifies the set of dominant terms.

17. The non-transitory computer-readable medium of claim 16, where the one or more instructions further cause the one or more processors to:
calculate a term similarity score between a pair of terms included in the set of dominant terms;
determine that the term similarity score, for the pair of terms, satisfies a first threshold;
merge the pair of terms to form a term cluster based on that the term similarity score, for the pair of terms, satisfying the first threshold; and
provide information that identifies the term cluster.

18. The non-transitory computer-readable medium of claim 17, where the one or more instructions further cause the one or more processors to:
calculate a requirement similarity score between a pair of requirements included in the set of requirements;
determine that the requirement similarity score, for the pair of requirements, satisfies a second threshold;
merge the pair of requirements to form a requirement cluster based on determining that the requirement similarity score, for the pair of requirements, satisfying the second threshold; and
provide information that identifies the requirement cluster.

19. The non-transitory computer-readable medium of claim 18, where the one or more instructions, that cause the one or more
processors to calculate the requirement similarity score between the pair of requirements, further cause the one or more processors to calculate the requirement similarity score based on at least one of:
a semantic similarity score between the pair of requirements, a placement similarity score between the pair of requirements, or the semantic similarity score and the placement similarity score.

20. The non-transitory computer-readable medium of claim 18, where the one or more instructions further cause the one or more processors to:
calculate an average similarity score between terms included in the term cluster and requirements included in the requirement cluster;
determine that the average similarity score satisfies a third threshold; and provide an indication that the term cluster and the requirement cluster are related based on that the average similarity score satisfying the third threshold.

* * * * *